United States Patent
Sozer

(10) Patent No.: US 11,264,877 B2
(45) Date of Patent: Mar. 1, 2022

(54) AXIAL FLUX MACHINE

(71) Applicant: Yilmaz Sozer, Stow, OH (US)

(72) Inventor: Yilmaz Sozer, Stow, OH (US)

(73) Assignee: THE UNIVERSITY OF AKRON, Akron, OH (US)

( * ) Notice: Subject to any disclaimer, the term of this patent is extended or adjusted under 35 U.S.C. 154(b) by 212 days.

(21) Appl. No.: 16/591,405

(22) Filed: Oct. 2, 2019

(65) Prior Publication Data

US 2020/0106351 A1    Apr. 2, 2020

Related U.S. Application Data

(60) Provisional application No. 62/739,911, filed on Oct. 2, 2018.

(51) Int. Cl.
| | |
|---|---|
| *H02K 1/27* | (2006.01) |
| *H02K 21/24* | (2006.01) |
| *H01F 1/057* | (2006.01) |
| *H02K 1/2793* | (2022.01) |
| *H02K 1/02* | (2006.01) |

(52) U.S. Cl.
CPC ............ *H02K 21/24* (2013.01); *H01F 1/057* (2013.01); *H02K 1/02* (2013.01); *H02K 1/2793* (2013.01)

(58) Field of Classification Search
CPC ........ H02K 21/24; H02K 1/2793; H02K 1/02; H02K 1/2766; H01F 1/057
See application file for complete search history.

(56) References Cited

U.S. PATENT DOCUMENTS

| | | | | |
|---|---|---|---|---|
| 6,373,162 | B1 * | 4/2002 | Liang | H02K 1/2793 310/112 |
| 2005/0127769 | A1 * | 6/2005 | Minagawa | H02K 21/24 310/156.32 |
| 2009/0243422 | A1 * | 10/2009 | Atarashi | H02K 21/24 310/216.074 |
| 2010/0090555 | A1 * | 4/2010 | Tajima | H02K 1/2793 310/156.35 |
| 2013/0088112 | A1 * | 4/2013 | Cho | H02K 1/2793 310/156.37 |
| 2019/0207446 | A1 * | 7/2019 | Swales | H02K 1/28 |

FOREIGN PATENT DOCUMENTS

CN        108233568 A  *  6/2018

OTHER PUBLICATIONS

Machine Translation, Yao, CN-108233568-A, Jun. 2018. (Year: 2018).*

* cited by examiner

*Primary Examiner* — Thomas Truong
(74) *Attorney, Agent, or Firm* — Renner Kenner Greive Bobak Taylor & Weber

(57) ABSTRACT

An axial flux machine (AFM) includes a rotor rotatably disposed between a pair of fixed stators. The rotor and the stators are formed of tape-wound laminated cores of ferromagnetic material. In addition, the rotor includes multiple layers of angled magnets that circumscribe the rotor. Such configuration enables the axial flux machine to achieve a high airgap flux density while achieving a high saliency ratio and lowered cogging torque as compared to current generation AFMs.

23 Claims, 31 Drawing Sheets

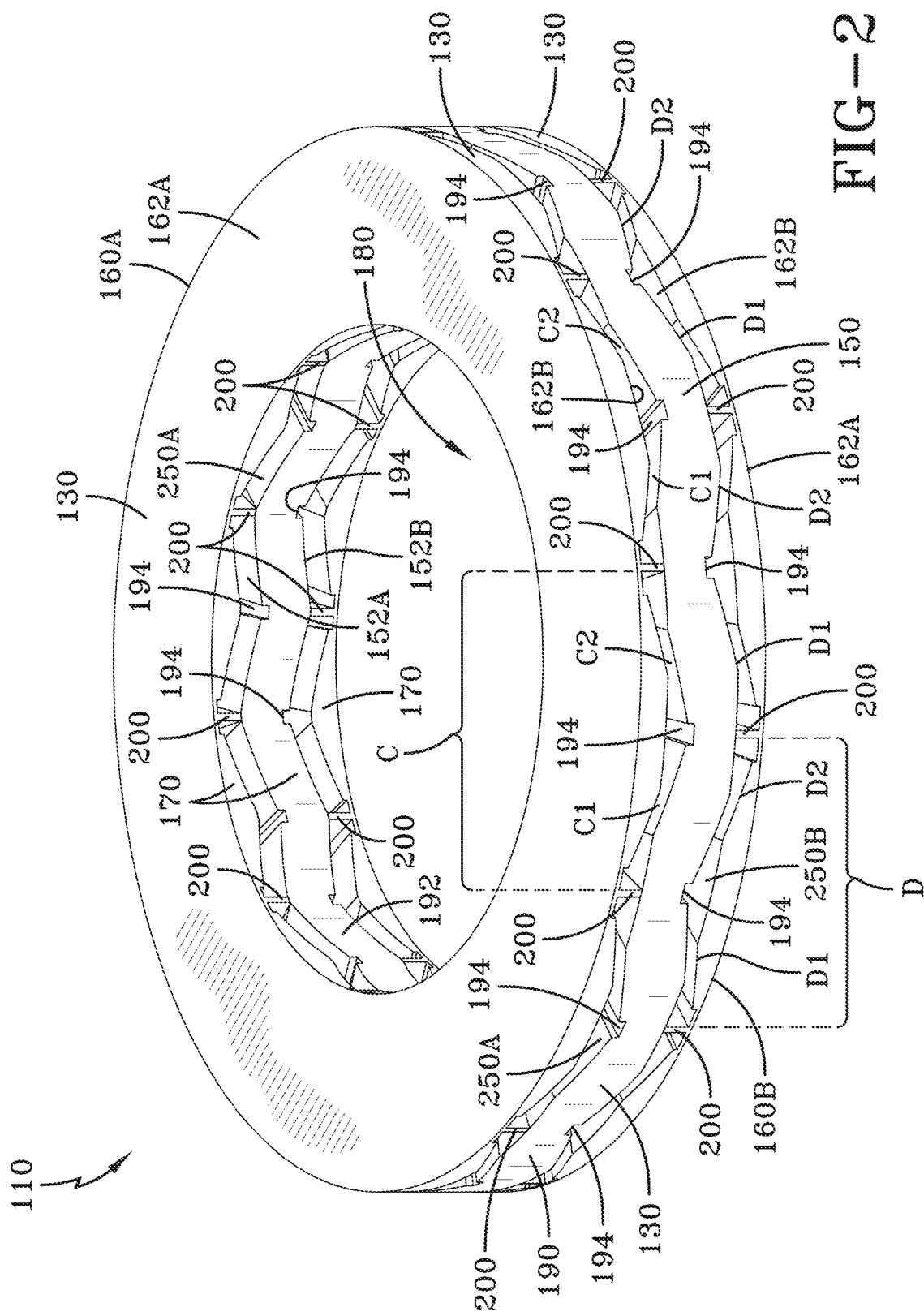

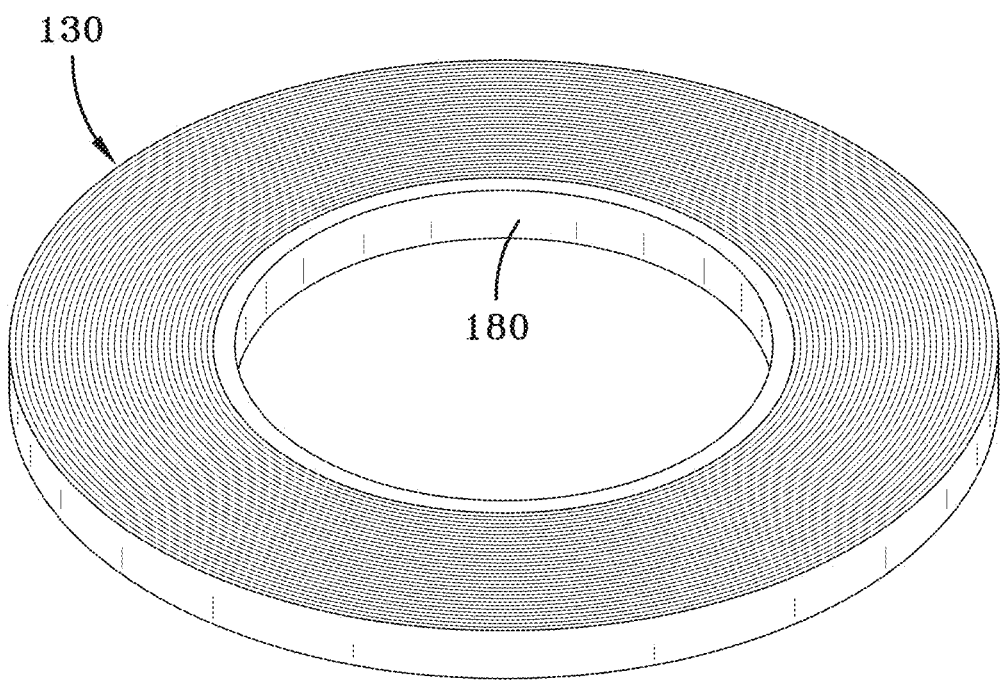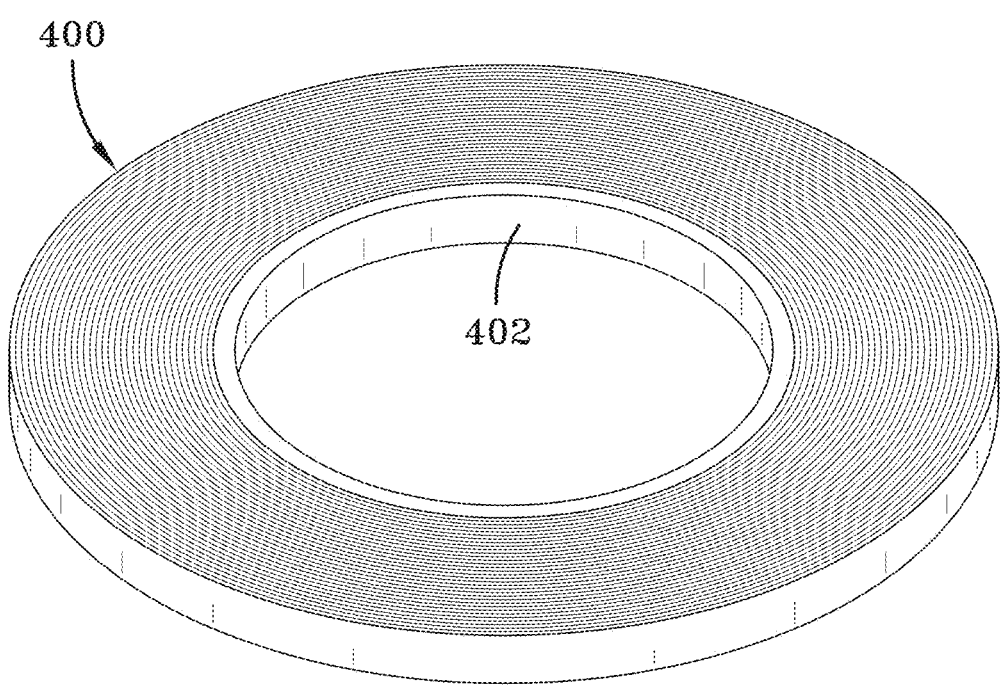
FIG-7

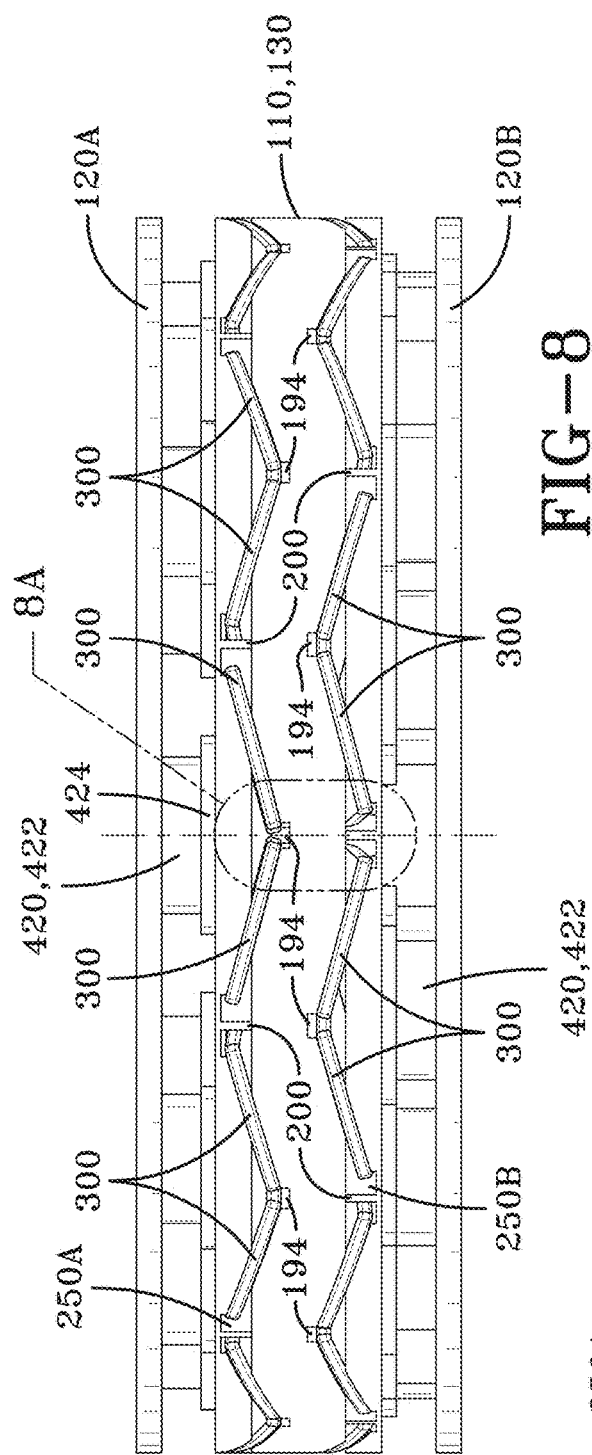
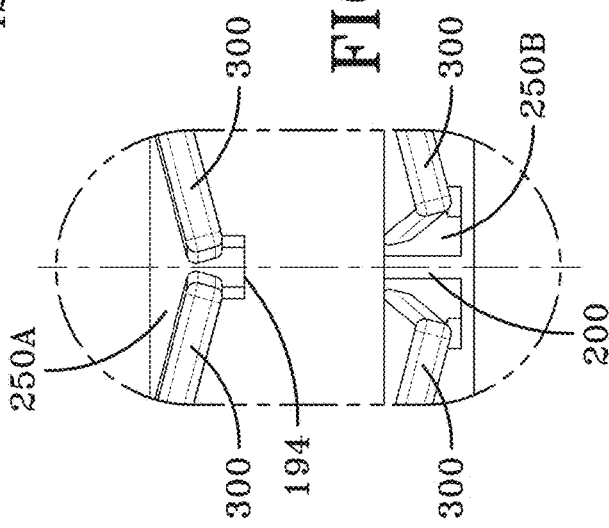

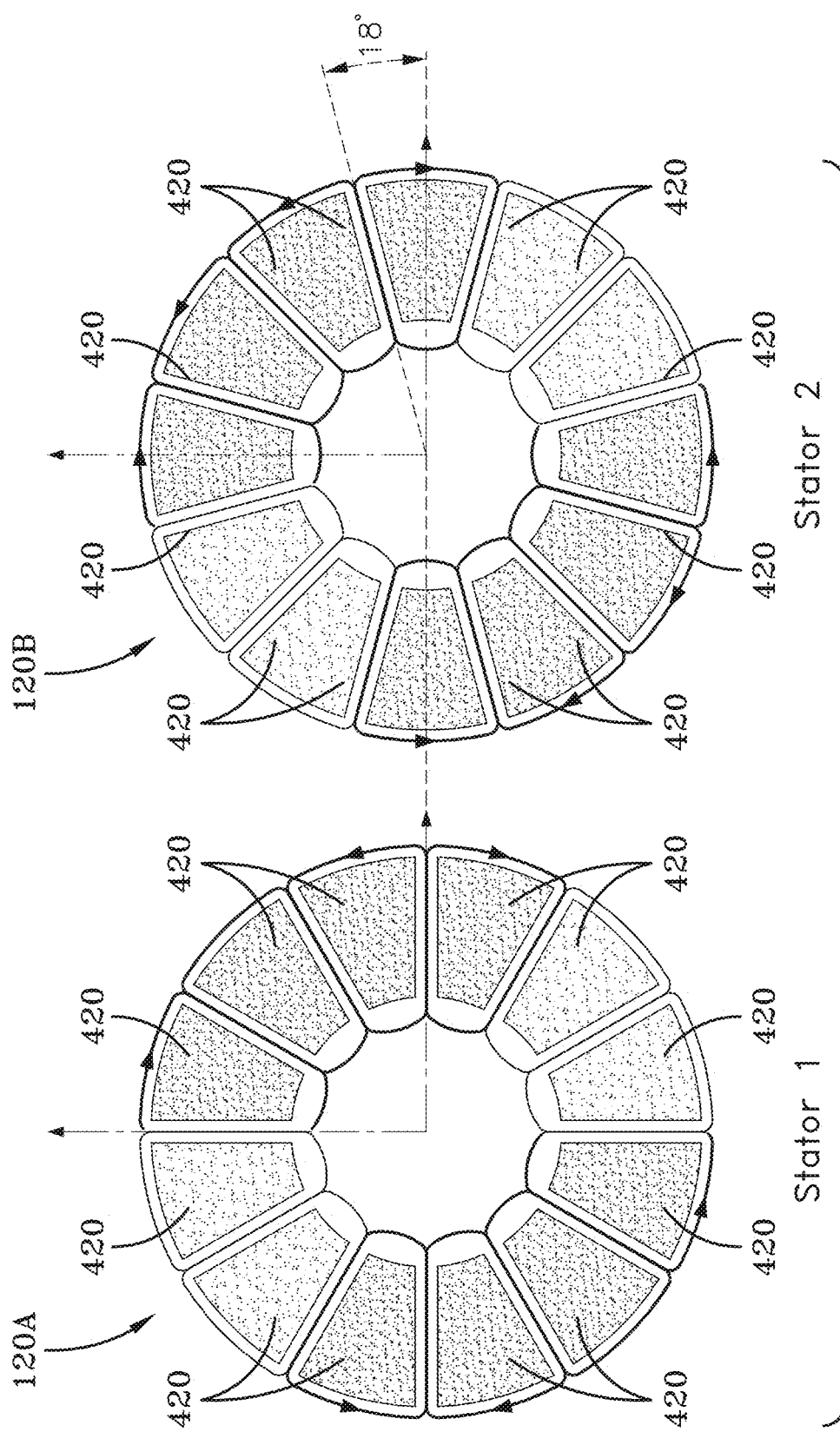

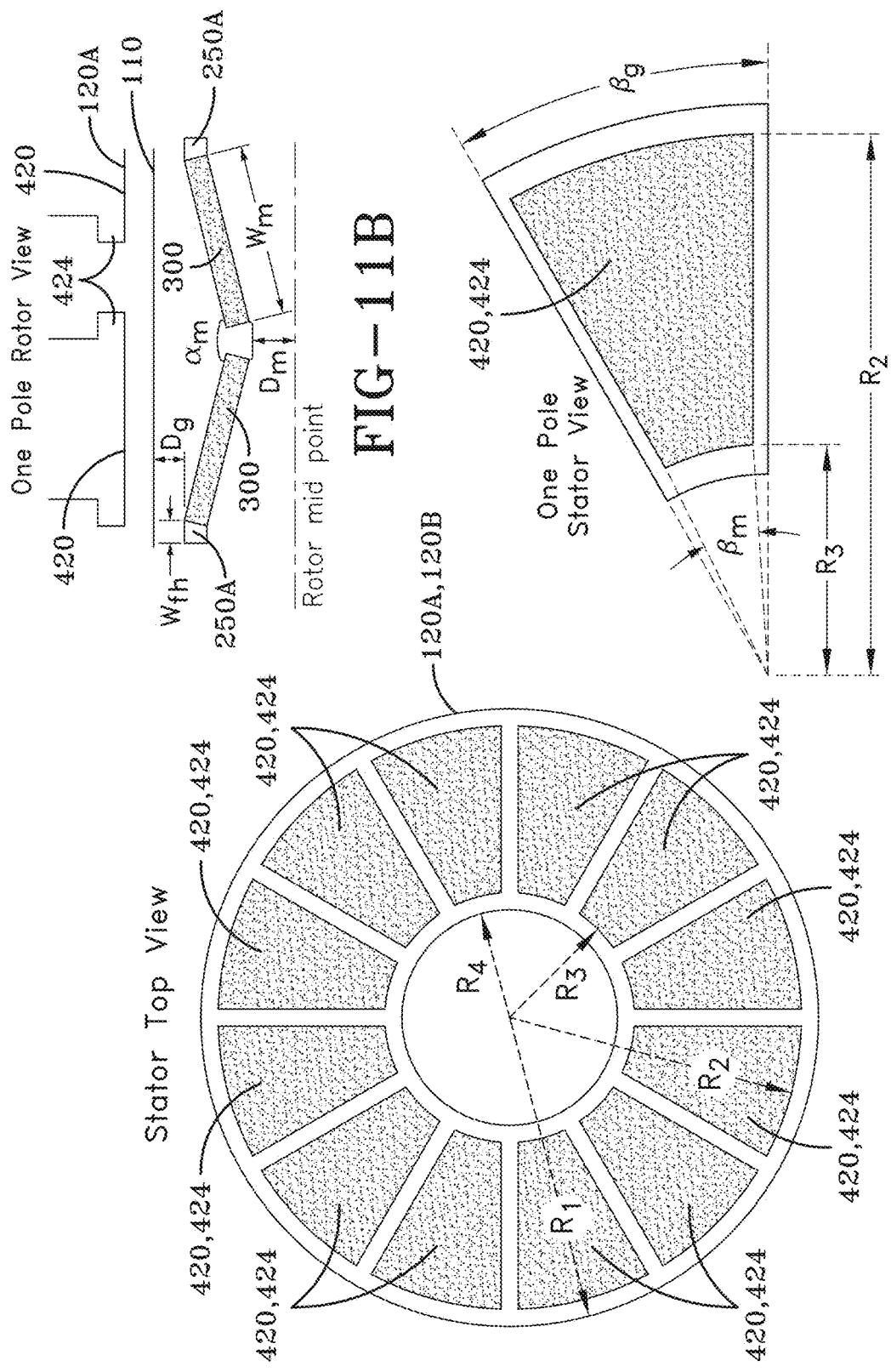

TABLE I   MOTOR SPECIFICATIONS

| Magnet | NdFeB 35 SH |
|---|---|
| Operation mode | Continuous |
| Current Density | 9 A/mm$^2$ |
| Rated Power | 5.75 kW |
| Rated Speed | 2000 rpm |
| Max Irms used | 19 A |
| Nominal Voltage | 400 V |
| Cogging Torque Max. | 1 Nm (pp) |

FIG-12

TABLE II.  AFM Comparison Table

| Parameter | AF-SPM | AF IPM | AF V-IPM |
|---|---|---|---|
| Stator poles | 12 | 12 | 12 |
| Rotor poles | 10 | 10 | 10 |
| Weight (kg) | 7.69 | 9.01 | 8.87 |
| Magnet weight (kg) | 0.857 | 1.063 | 0.799 |
| Average Torque (Nm) | 31.2 | 28.5 | 28.5 |
| Speed (rpm) | 2000 | 2000 | 2000 |
| Power (kW) | 6.53 | 5.97 | 5.97 |
| Torque density (Nm/kg) | 4.06 | 3.16 | 3.25 |
| Current density (A/mm2) | 6.8 | 7.99 | 8.87 |
| Power factor | 0.93 | 0.86 | 0.92 |
| Cogging torque peak (Nm) | 0.64 | 1.1 | 0.5 |
| Iron loss (W) at 2000 rpm | 121 | 102 | 100 |
| Copper loss | 248 | 201 | 203 |
| Efficiency (%) | 94.55 | 95.29 | 95.85 |

FIG-22A

TABLE III.  LINEAR ELECTRIC PROPERTIES OF THE MACHINES

| Machine | Lq (mH) | Ld(mH) | PM Flux linkage (V.s) |
|---|---|---|---|
| AF-SPM | 2.63 | 2.62 | 0.158 |
| AF IPM | 3 | 2.71 | 0.151 |
| AF V-IPM | 5.5 | 2.5 | 0.131 |

FIG-22B

AXIAL FLUX MACHINE

CROSS-REFERENCE TO RELATED APPLICATION

This application claims the benefit of U.S. Provisional Application No. 62/739,911 filed Oct. 2, 2018 the contents of which are incorporated herein by reference.

TECHNICAL FIELD

The various embodiments disclosed herein relate to axial flux machines. More particularly, the various embodiments disclosed herein relate to axial flux machines having a rotor that utilizes interior permanent magnets. Particularly, the various embodiments disclosed herein relate to axial flux machines that utilize a rotor having two layers of interior permanent magnets, whereby the magnets are arranged at alternating angles.

BACKGROUND

Axial flux machines (AFM) have recently gained substantial attention due to their high-performance operation and compact pancake-type form factor, which allows them to be utilized in a variety of applications, including where there are space constraints. Furthermore, AFMs encompass many varieties, and are classified according to their rotor/stator configuration, slot structure and permanent magnet (PM) orientation.

Many AFMs utilize a surface permanent magnet (SPM) topology, and as a result, AFMs generally have low inductance and saliency. This results in a narrow constant power speed range (CPSR) operation. To improve this narrow CPSR, various design solutions have been pursued, including AFM designs that utilize interior permanent magnet (IPM) topologies. For example, axial flux machines with interior permanent magnet topologies (AF-IPM) were studied for use in electric vehicles. These AF-IPM machines utilized tangential magnets, which caused not only a higher inductance and saliency to be achieved, but also assisted in flux weakening allowing the machines to achieve a wider CPSR range. However, such AF-IPM designs required a magnet orientation that resulted in a very low airgap flux density, which was unable to achieve a flux concentration commensurate with that generated by their radial flux machines (RFM) counterparts, and as a result, AF-IPMs achieve a lowered torque density, which is unwanted. To overcome this drawback, designers of AF-IPMs altered their flux concentration so that it would enter the airgap of the AF-IPM. However, this essentially created a transverse flux machine due to the transverse flux path in the stator back-iron of the AF-IPM, which resulted in a rotor structure that is difficult and time consuming to construct.

To overcome these drawbacks of current axial flux machine (AFM) designs, including AFMs that utilize interior permanent magnets, the various embodiments disclosed herein contemplate an axial flux machine (AFM) that utilizes a rotor having multiple layers of angled interior permanent magnets to achieve a high airgap flux density, while obtaining a high saliency ratio (i.e. higher inductance and higher saliency over conventional AFMs). In addition, the various embodiments of the AFM disclosed herein utilize a smooth rotor structure, which allows reduced cogging torque to be achieved when compared to current generation AF-IPMs. Furthermore, the various embodiments of the AFM disclosed herein utilize a double stator single rotor (DSSR) configuration, which allows balanced axial forces to be attained. Still yet, the various embodiments of the AFM disclosed herein are able to operate over a wide speed range, while the use of layers of angled magnets allows reluctance torque and flux weakening to be achieved while reducing the number of magnets needed to achieve the same power rating by current generation AFM designs.

SUMMARY

It is a first aspect of the various embodiments disclosed herein to provide an axial flux machine that includes a first stator having a plurality of spaced teeth and a first aperture; a second stator having a plurality of spaced teeth and a second aperture; and a rotor having a third aperture, the rotor rotatable between the first and second stators, wherein a center of the apertures are axially aligned with an axis, and wherein the teeth of the first and second stators are offset from each other; wherein the rotor includes a first gap including a plurality of magnets, wherein each magnet in the first gap is positioned at an angle relative to the magnets adjacent thereto that are in the first gap, and wherein the rotor includes a second gap including a plurality of magnets, wherein each magnet in the second gap is positioned at an angle relative to the magnets adjacent thereto that are in the second gap.

It is another aspect of the various embodiments disclosed herein to provide an axial flux machine that includes a first stator having a plurality of spaced teeth and a first aperture; a second stator having a plurality of spaced teeth and a second aperture; and a rotor having a third aperture, the rotor rotatable between the first and second stators, wherein a center of the apertures are axially aligned with an axis, and wherein the teeth of the first and second stators are offset from each other; wherein the rotor includes a first group of circumferentially disposed magnets, wherein each magnet of the first group is positioned at an angle relative to the magnets adjacent thereto that are in the first group, and wherein the rotor includes a second group of circumferentially disposed magnets, wherein each magnet of the second group is positioned at an angle relative to the magnets adjacent thereto that are in the second group.

It is yet another aspect of the various embodiments disclosed herein to provide an axial flux machine that includes a first stator having a plurality of spaced teeth; a second stator having a plurality of spaced teeth; and a rotor rotatable between the first and second stators, wherein the teeth of the first and second stators are angularly offset from each other; wherein the rotor includes a first group of circumferentially disposed magnets, with the magnets of the first group being positioned at alternating angles to one another, and wherein the rotor includes a second group of circumferentially disposed magnets, with the magnets of the second group being positioned at alternating angles to one another.

BRIEF DESCRIPTION OF THE DRAWINGS

These and other features and advantages of the various embodiments disclosed herein will become better understood with regard to the following description, appended claims, and accompanying drawings, wherein:

FIG. 2 is a perspective view of a rotor utilized with the AFM shown in FIG. 1 in accordance with the concepts of the various embodiments disclosed herein;

FIG. 7 is a perspective view of a pair of tape-wound ferromagnetic material used to form the rotor and stators of by the AFM in accordance with the concepts of the various embodiments disclosed herein;

FIG. 8 is an elevational view of the AFM in accordance with the concepts of the various embodiments disclosed herein;

FIG. 8A is an inset view of FIG. 8 showing the gaps provided by the rotor in accordance with the concepts of the various embodiments disclosed herein;

FIG. 9 is a top view of the stators of the AFM in accordance with the concepts of the various embodiments disclosed herein;

FIG. 11A is a top plan view of the stators of the AFM in accordance with the concepts of the various embodiments disclosed herein;

FIG. 11B is a cross-sectional view of a pair of magnets within a gap group forming one pole in accordance with the concepts of the various embodiments disclosed herein;

FIG. 11C is a top plan view of a stator tooth in accordance with the concepts of the various embodiments disclosed herein;

FIG. 12 is a table showing specifications of the AFM in accordance with the concepts of the various embodiments disclosed herein;

FIG. 22A is a chart showing performance characteristics of various AFM topologies, including that of the AF V-IPM disclosed herein and in accordance with the concepts of the various embodiments disclosed herein;

FIG. 22B is a chart showing linear electric properties of various AFM topologies, including that of the AF V-IPM disclosed herein and in accordance with the concepts of the various embodiments disclosed herein;

DETAILED DESCRIPTION

Figure 1:
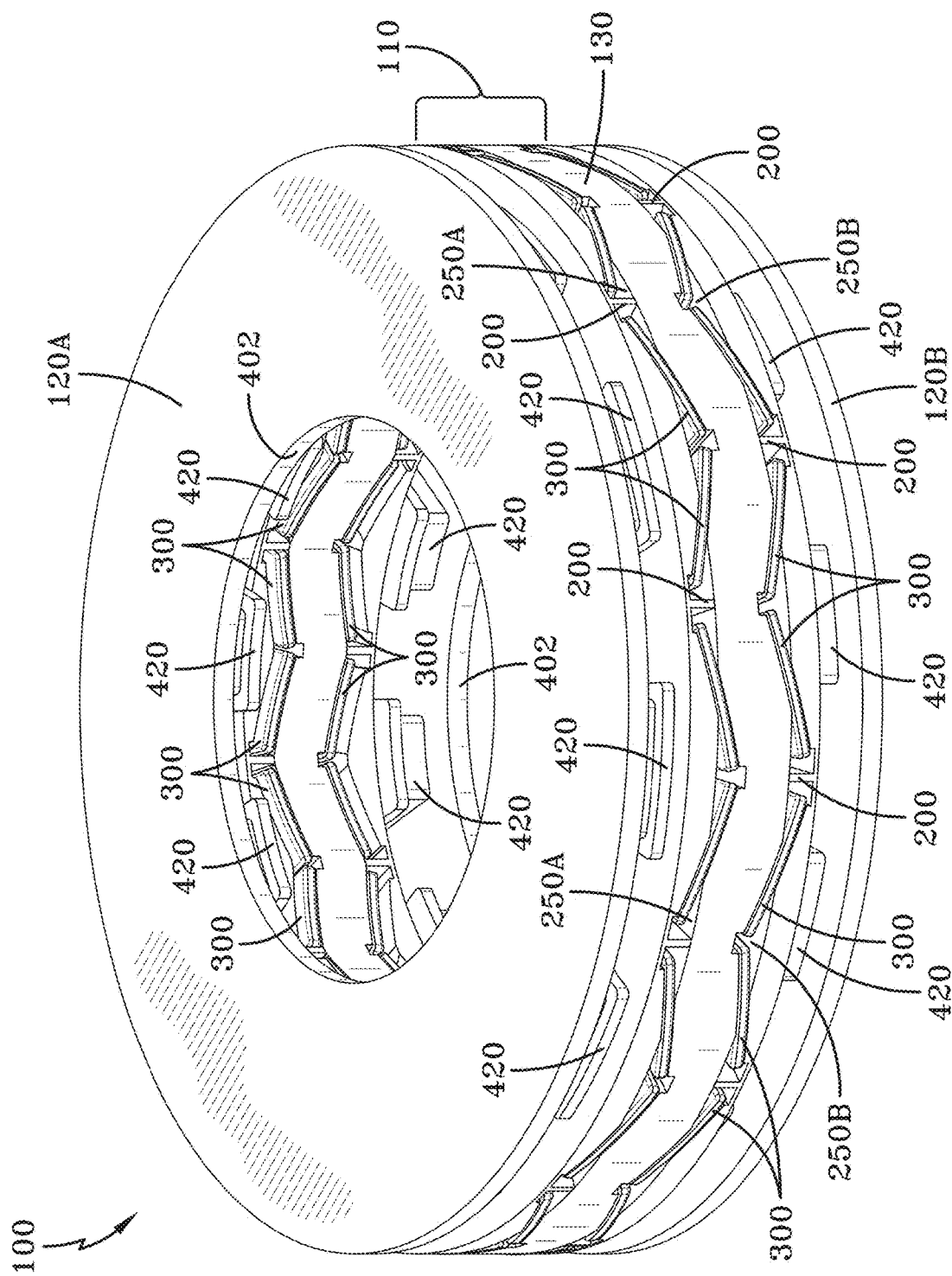
FIG. 1 is a perspective view of an axial flux machine (AFM) in accordance with the concepts of the various embodiments disclosed herein.

Various embodiments of an axial flux machine (AFM) are disclosed herein, whereby one embodiment of the AFM is referred to by numeral 100, as shown in FIG. 1. The AFM includes a rotor 110 that is placed between a pair of spaced, fixed stators 120A and 120B. Such a configuration may be referred to as a double stator single rotor (DSSR) design. Multiple layers of permanent magnets (PM) are disposed in the rotor 110 at an angle to each other so that the rotor 110 is able to achieve reluctance torque and to obtain extended speed operating range. Accordingly, the AFM 100 contemplated herein may be referred to as being an axial flux machine having a rotor 110 that includes an angled interior permanent magnet configuration (AF V-IPM).

Specifically, the rotor 110, shown in FIGS. 1-4A, comprises a core or body 130. The core 130 may be formed of laminated ferromagnetic material including tape-wound ferromagnetic material (FIG. 7), which includes but is not limited to: silicon, nickel, iron, steel or any other suitable ferromagnetic material, as well as composites thereof, such as soft magnetic composites (SMC). It should be appreciated that in other embodiments, non-laminated ferromagnetic material may be used for the core 130. Continuing, the core or body 130 of the rotor 110 includes a plurality of connected rings, such as a central ring 150 having opposed surfaces 152A-B and a pair of outer rings 160A and 160B that each have opposed surfaces 162A-B. The outer rings 160A and 160B and are disposed on either side of the central ring 150. In addition, each of the central ring 150 and the outer rings 160A and 160B include a central aperture 170, whereby the center of each of the apertures 170 provided by the rings 150 and 160A-B are in axial alignment with each other when the rotor 110 is assembled. As such, the central apertures 170 of the rings 150 and 160A-B together form a main aperture 180 of the rotor 110. Accordingly, the assembled rotor 110 has an outer annular edge 190 defining an outer diameter of the rotor 110 and an inner annular edge 192 defining an inner dimeter or the rotor 110.

Figure 4:
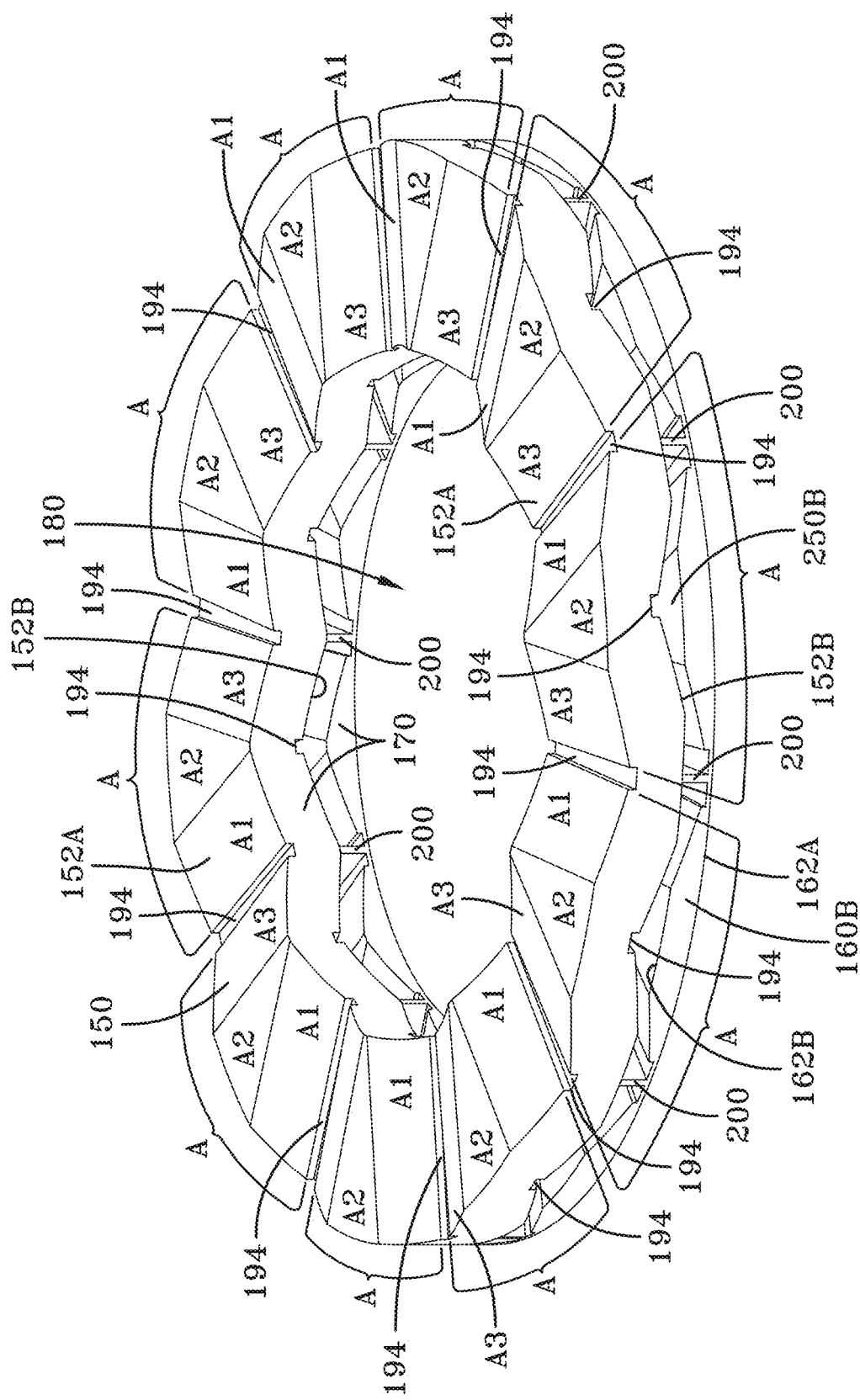
FIG. 4 is a perspective view of the rotor with one of the outer rings removed in accordance with the concepts of the various embodiments disclosed herein.
Figure 4A:
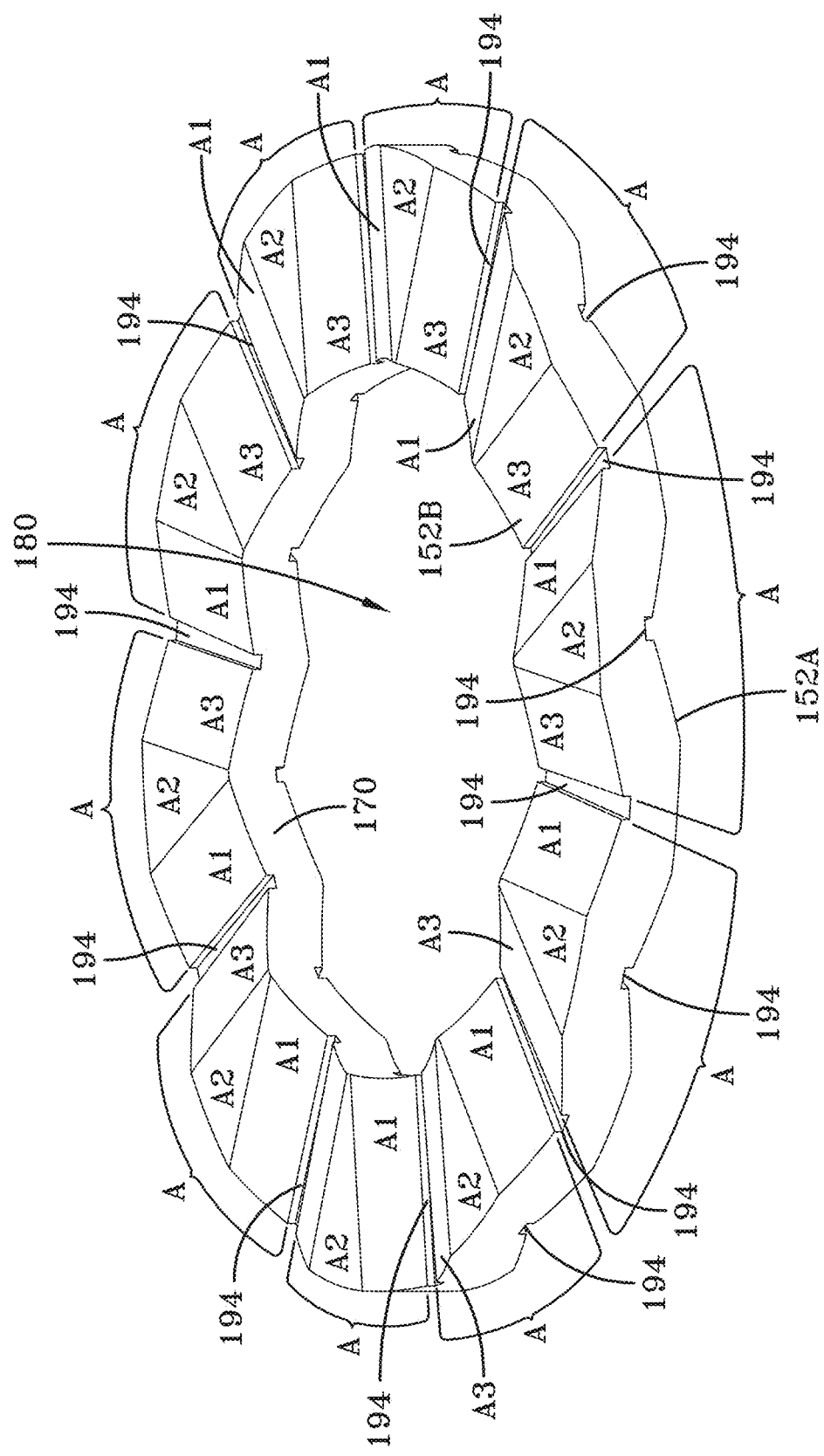
FIG. 4A is a perspective view of the rotor central ring in accordance with the concepts of the various embodiments disclosed herein.

Continuing, the opposed surfaces 152A and 152B of the central ring 150 are configured to each include multiple sloped or angled surface segments. In some embodiments, these sloped or angled surfaces 152A and 152B contain segments that alternate between different directions or angles. For example, as shown in FIGS. 4 and 4A, the surfaces 152A and 152B may each include multiple repeating groups, referred to by the designation "A", with each group A containing multiple surface segments, each denoted by the designations A1, A2, and A3, that are in a different plane from each other. It should be appreciated that each repeating group A is separated from another adjacent group A by channels or grooves 194 that extend radially from the axial center of the rotor 110. Furthermore, the angled surface segments A1-3 may be configured so that one or more of the segments are not parallel to the outer surfaces 162A of the outer rings 160A-B of the rotor 110. For example, segment A2 may be parallel to the outer surfaces 162A of the outer rings 160A-B of the rotor 110, while the segments A1 and A3 are not parallel to the outer surfaces 162A of the outer rings 160A-B of the rotor 110.

In addition, the surface 162B of each of the outer rings 160A and 160B that is positioned proximate to the central ring 150 is also configured to include sloped or angled surface segments. In some embodiments, these sloped or angled surface segments alternate between different directions or angles. For example, as shown in FIGS. 4 and 4A, the surface 162B of the outer rings 160A and 160B may each include multiple repeating groups, referred to by the designation "B", with each group B containing multiple surface segments, each denoted by the designations B1, B2, and B3, that are in a different plane from each other. It should be appreciated that each repeating group B is separated from another adjacent group B by projections or legs 200 that extend radially from the axial center of the rotor 110. It should be appreciated that the projections 200 operate as flux barriers to reduce leakage flux in the magnets 300, thereby allowing the magnets 300 to exhibit the desired anisotropy to produce reluctance torque. Furthermore, the angled surface segments B1-3 may be configured so that one or more of the segments thereof are not parallel to the planar outer surfaces 162A of the outer rings 160A-B of the rotor 110. For example, segment B2 may be parallel to the outer surfaces 162A of the outer rings 160A-B of the rotor 110, while segments B1 and B3 are not parallel to the outer surfaces 162A of the outer rings 160A-B. Accordingly, the surface 160A of the outer rings 160A-B that are distal to the central ring 110 may be planar or flat.

Figure 2A:
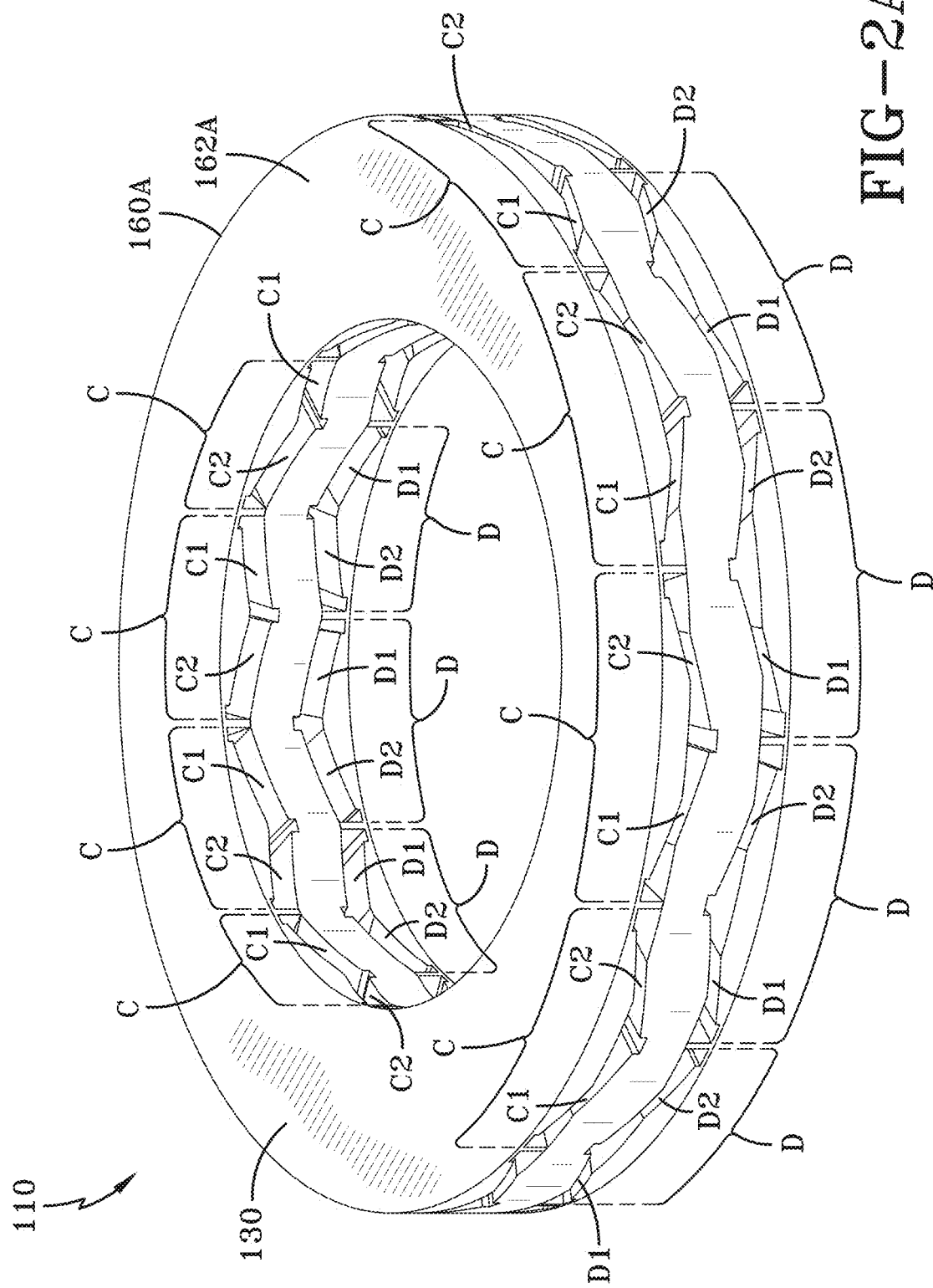
FIG. 2A is another perspective view of the rotor shown in FIG. 2 in accordance with the concepts of the various embodiments disclosed herein.

The central ring 150 of the rotor 110 is spaced apart and connected to the outer rings 160A and 160B by the legs or projections 200 to form respective annular gaps 250A and 250B between the central ring 150 and the outer rings 160A and 160B respectively that circumscribe the rotor 110. In particular, the projections 200 provided by the outer rings 160A and 160B are attached to the surface segment A2 of the center ring 150. Thus, by virtue of the angled surfaces 152A and 1526 of the central ring 150 and the angled surfaces 162B of the outer rings 160A and 160B, the gaps 250A and 250B are defined, which may form an alternating angled pattern, such as a zig-zag pattern, for example. Thus, in the assembled rotor 110 structure the projections 200 serve to define a plurality of angled gap groups in the gap 250A that is between the center ring 150 and the outer ring 160A, which are denoted by the identifier "C". As shown in FIG. 2, each of the gap groups C include a plurality of gap segments, such as 2 gap segments, which are denoted as C1 and C2, and that are arranged at an angle relative to each other. Similarly, the projections 200 serve to define a plurality of angled gap groups in the gap 250B that is between the center ring 150 and the outer ring 160B, which are denoted by the identifier "D". As shown in FIG. 2, each gap group D includes a plurality of gap segments, such as 2 gap segments, which are denoted as D1 and D2 and that are arranged at an angle relative to each other. It should be appreciated that the gap segments C1 and C2 of group C of the gap 250A and the gap segments D1 and D2 of group D of the gap 250B are arranged so that the gap segment C1 is parallel with the gap segment D2, and the gap segment C2 is parallel with the gap segment D1.

Figure 5:
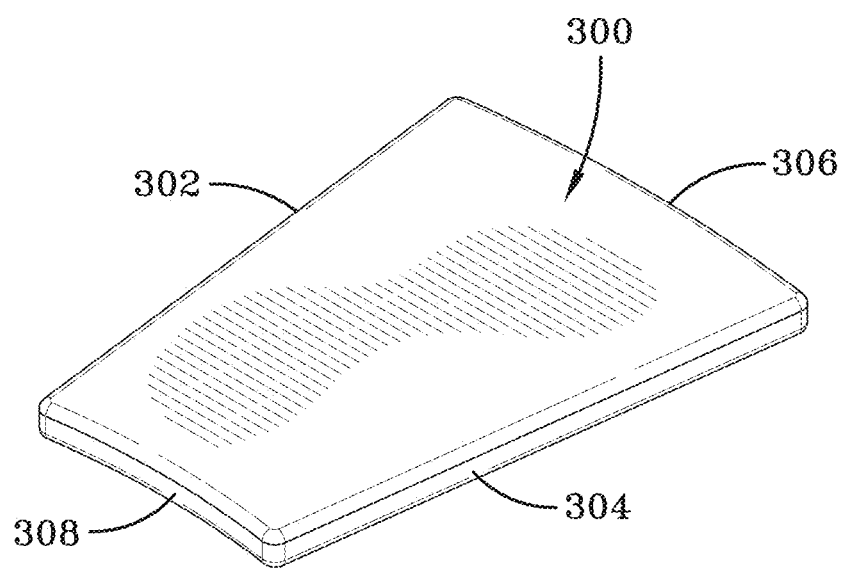
FIG. 5 is a perspective view of a magnet used by the rotor in accordance with the concepts of the various embodiments disclosed herein.
Figure 10:
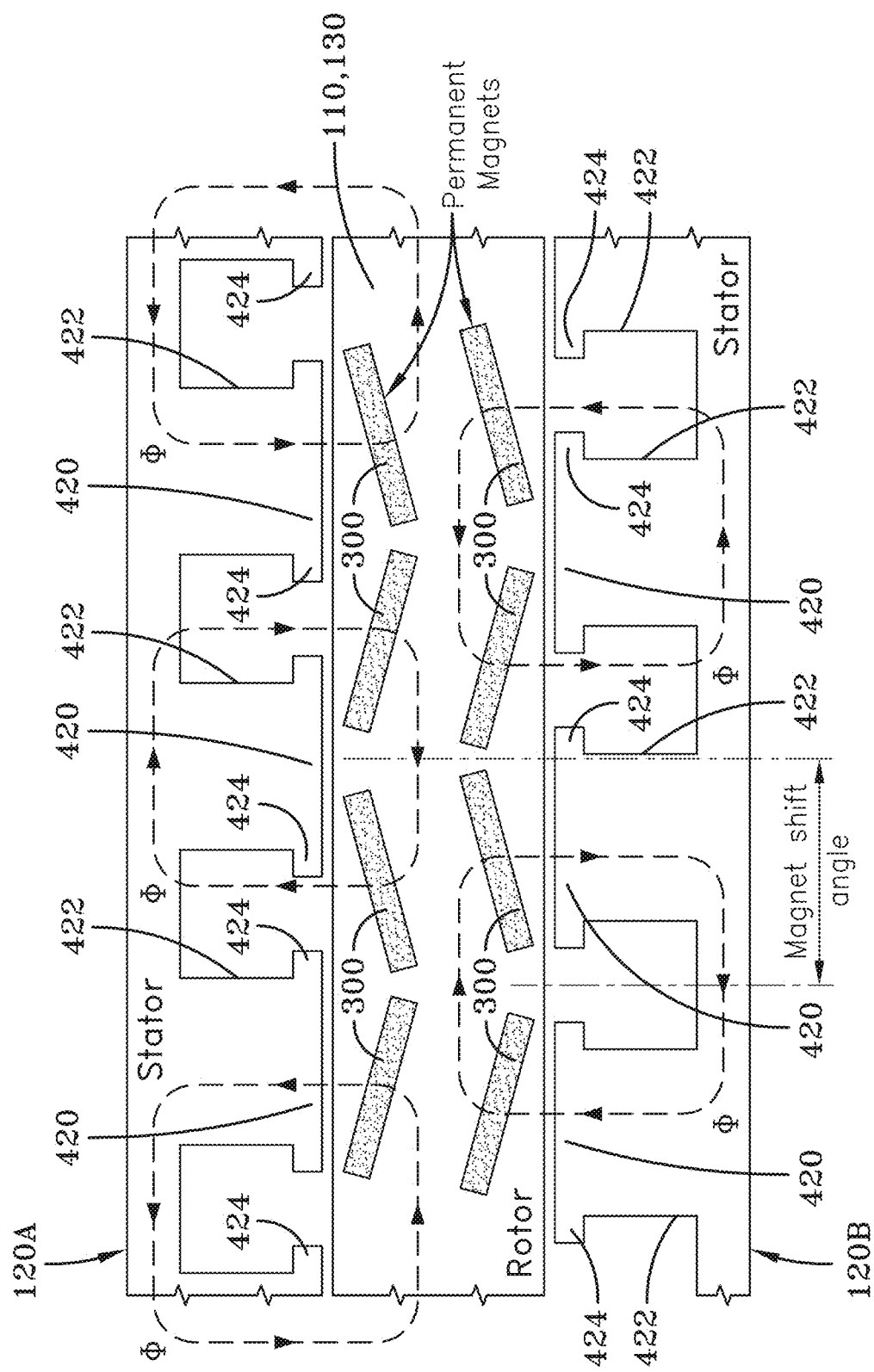
FIG. 10 is a diagrammatic elevational view of the stators and the rotor of the AFM in accordance with the concepts of the various embodiments disclosed herein.

Disposed within each of the gap segments C1, C2 of group C and disposed within each of the gap segments D1 and D2 of group D are magnets 300, as shown in FIG. 5. It should be appreciated that each pair of magnets 300 in a given group C are magnetized in an axial direction that is different from the pairs of magnets 300 that are in other groups C that are adjacent to the given group C. Similarly, each pair of magnets 300 in a given group D are magnetized in an axial direction that is different from the pairs of magnets 300 that are in other groups D that are adjacent to the given group D. In other words, the direction of axial magnetization of each pair of magnets 300 in group C and in group D alternates between a first and a second direction about the circumference of the rotor 110. In addition, groups C and D are rotationally offset so that at least one magnet 300 in a pair within a given group C having an axial magnetization in a first direction overlaps a magnet 300 in group D that has an axial magnetization in a direction that is different from the first direction. It should be appreciated that each group C magnets 300 and each group D magnets 300 represents a pole of the rotor 110. In some embodiments, the rotor 110 may have any number of poles, such as 10 poles. As previously discussed, groups C and groups D that circumscribe the rotor body 130 are offset so that the magnet 300 in the segment C1 overlaps the magnet 300 in the segment D2, while the magnet 300 in the segment C2 segment overlaps the magnet 300 in the segment D1. Thus, in this embodiment, the segments C1 and C2 in gap 250A and respective segments D2 and D1 in gap 250B are parallel with each other, resulting in the arrangement of the magnets 300 as shown in FIG. 10.

Figure 10A:
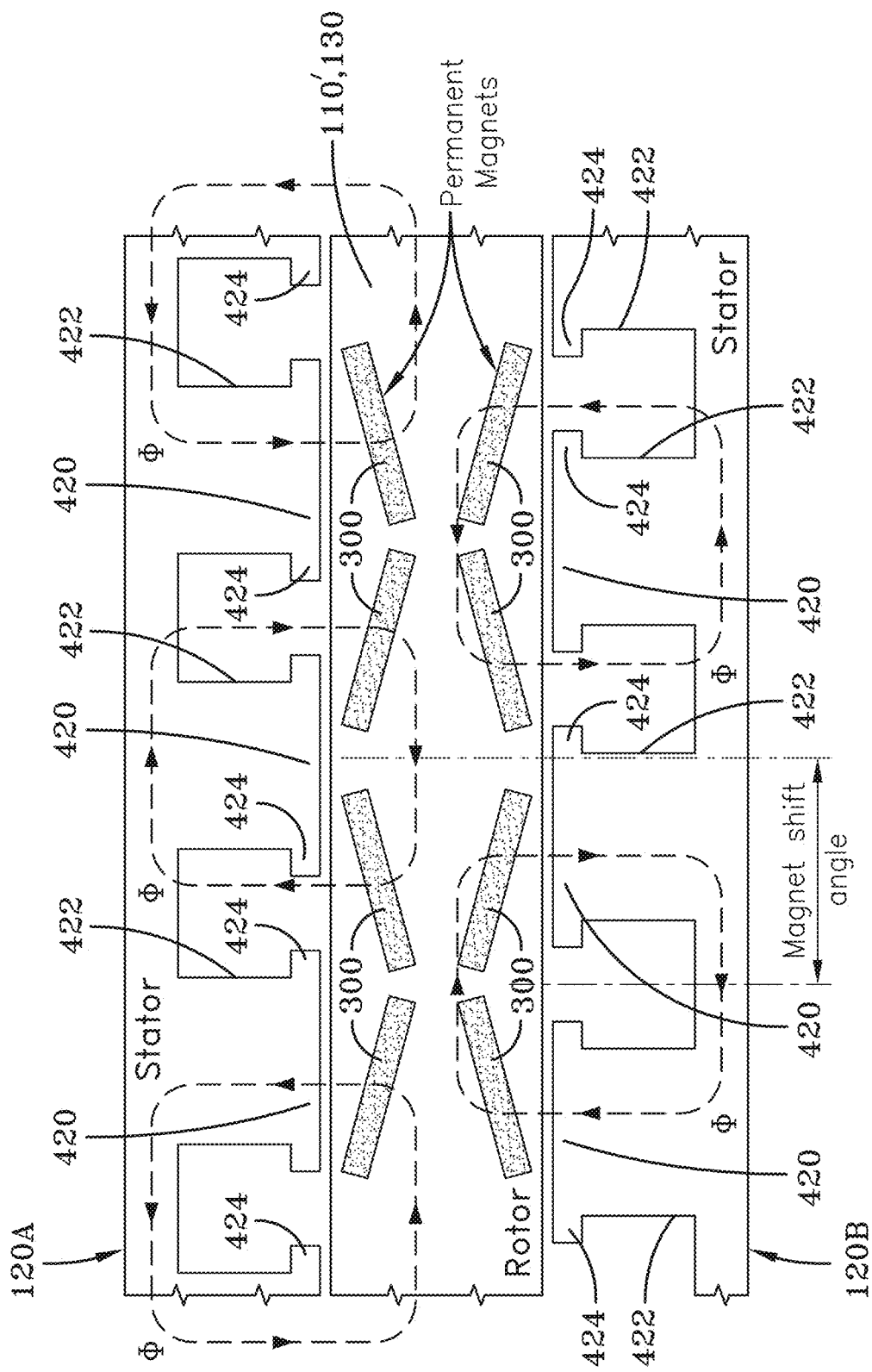
FIG. 10A is a diagrammatic elevational view of the stators and an alternative rotor of the AFM in accordance with the concepts of the various embodiments disclosed herein.

It should be appreciated that in an alternative rotor 110', the gaps 250A and 250B may be arranged in alternative manners to that disclosed above. For example, the gaps 250A and 250B may be arranged, whereby the segments C1 and D2 are not parallel with each other and whereby the segments C2 and D1 are not parallel with each other. As a result, the magnets 300 are arranged as shown in FIG. 10A, as mirror images of each other. That is, the arrangement of the magnets 300 in the gap 250A is a mirror image of the arrangement of the magnets in gap 250B. Such a configuration of the rotor 110' has been found to generate more balanced torque when the AFM 100 is in operation.

Figure 10B:
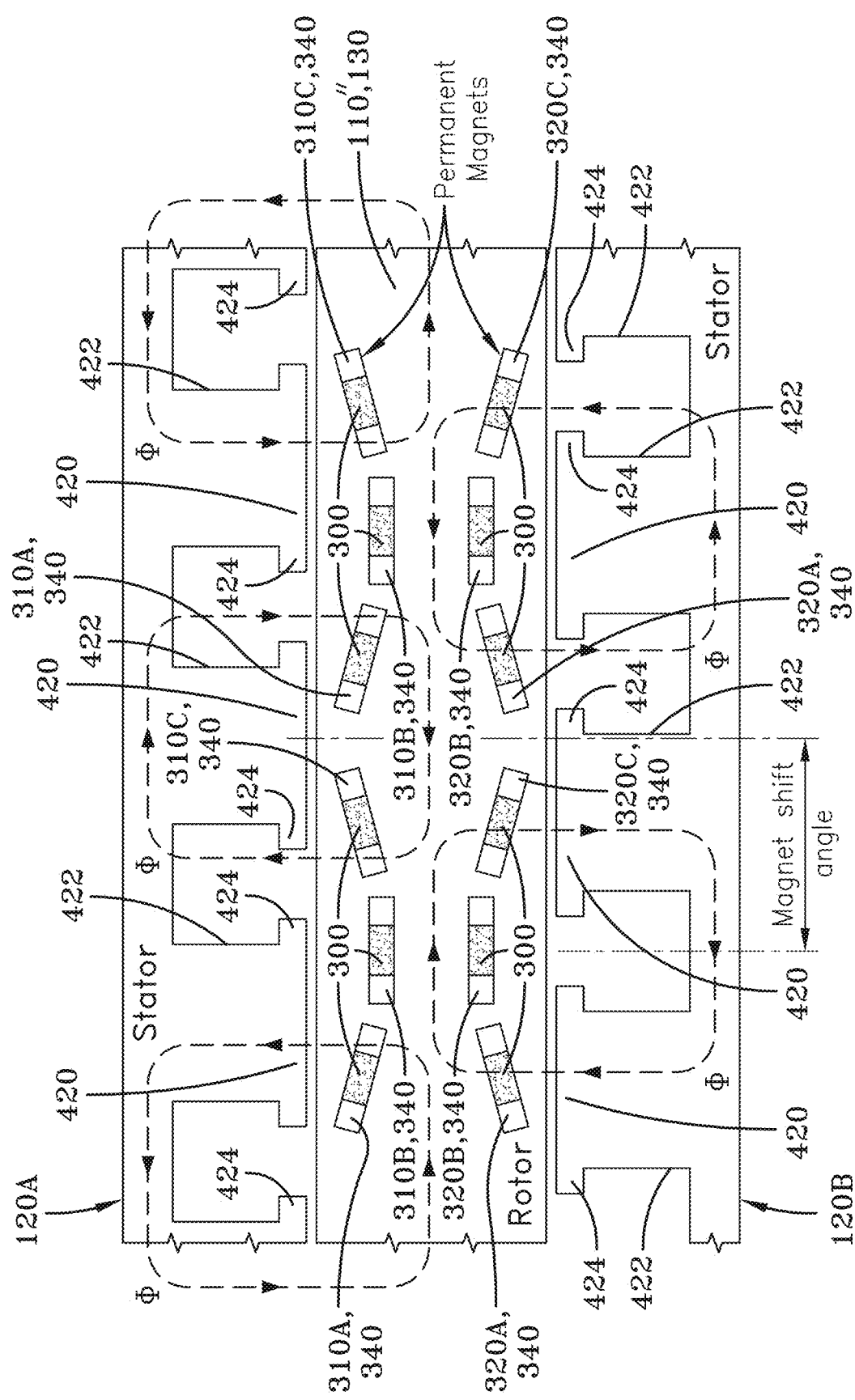
FIG. 10B is a diagrammatic view of the stators and a further alternative rotor of the AFM in accordance with the concepts of the various embodiments disclosed herein.

In some embodiments, an alternative rotor 110", as shown in FIG. 10B, may be configured as multiple layers of a discrete group of gaps or cavities. In some embodiments, each gap or cavity is arranged at an angle to an adjacent gap or cavity within a given layer. For example, as shown in FIG. 10B, gaps/cavities 310A, 310B, and 310C may be arranged to form one group in one layer, and gaps/cavities 320A, 320B, and 320C may be arranged to form a second group in another layer. In some embodiments, each of the groups are circumferentially disposed about the rotor 110" as repeating groups. Furthermore, the gaps 310A and 320A may be overlapped, the gaps 310B and 320B may be overlapped, and the gaps 310C and 320C may be overlapped. In addition, the gaps or cavities 310 and 320 carry therein the magnet 300. However, the gaps or cavities 310 and 320 are dimensioned so that they are larger than the dimension of the magnet 300 that is positioned in the gaps or cavities 310 and 320. This forms one or more secondary cavities 340 within a given cavity 310 or 320. These secondary cavities 340 allow other material, such as a gas including air, to be included with the magnet 300 in a given cavity 310, 320. In some embodiments, the gaps 310 and 320 and the secondary cavities provided thereby may be enclosed by the core material 130 that forms the rotor 110". In some embodiments, the cavities 310A and 320A are arranged in the core 130 of rotor 110" so as to be non-parallel; cavities 310B and 320B are arranged so as to be parallel; and cavities 310C and 320C are arranged so as to be non-parallel. Accordingly, the magnets 300 carried within these cavities 310 and 320 also take on the associated parallel and non-parallel arrangement formed by the cavities 310 and 320. It should be appreciated that the magnets 300 carried within one layer of repeating cavities are arranged at an angle with respect to adjacent magnets in that layer, while the magnets arranged within another layer of repeating cavities are arranged at an angle with respect to adjacent magnets in that layer.

The magnets 300 may include permanent magnets (PM) formed of any suitable magnetic material, including, but not limited to, NdFeB (neodymium iron boron; NIB). The magnets 300 may be any suitable shape; however in some embodiments, the magnets may be trapezoidal or wedge shaped. For example, in the case of the trapezoidal shaped magnets 300, they are substantially planar and are bounded by divergent lateral edges 302 and 304 and opposed convex and concave edges 306 and 308, such that the concave edge 308 of the magnets is positioned proximate to the main aperture 180 of the rotor 110. The magnets 300 are dimensioned to be received into each of the gap segments C1-2 and D1-2 and retained therein using any suitable means of fixation, such as adhesive for example. It should be appreciated that in some embodiments, one or more of the gaps 250A and 250B may extend radially all the way through the core or body 130 of the rotor 110 from the outer diameter or annular edge 190 of the rotor 110 to the inner or annular diameter edge 192 of the rotor 110. As such, the magnets 300 disposed in such gaps 250A-B may be exposed to the outside environment by some amount. However, in other embodiments, one or more of the gaps 250A and 250B may be fully or partially closed by the core 130 of the rotor 110 so that one or more of the openings formed by the gaps 250A-B are closed off at one or more of the inner and outer periphery edge 190 and/or 192 of the rotor 110. It should be appreciated that in some embodiments, the core 130 is configured so that the magnets 300 are made integral with the core 130, such that the gaps 250A-B are not present.

Figure 6:
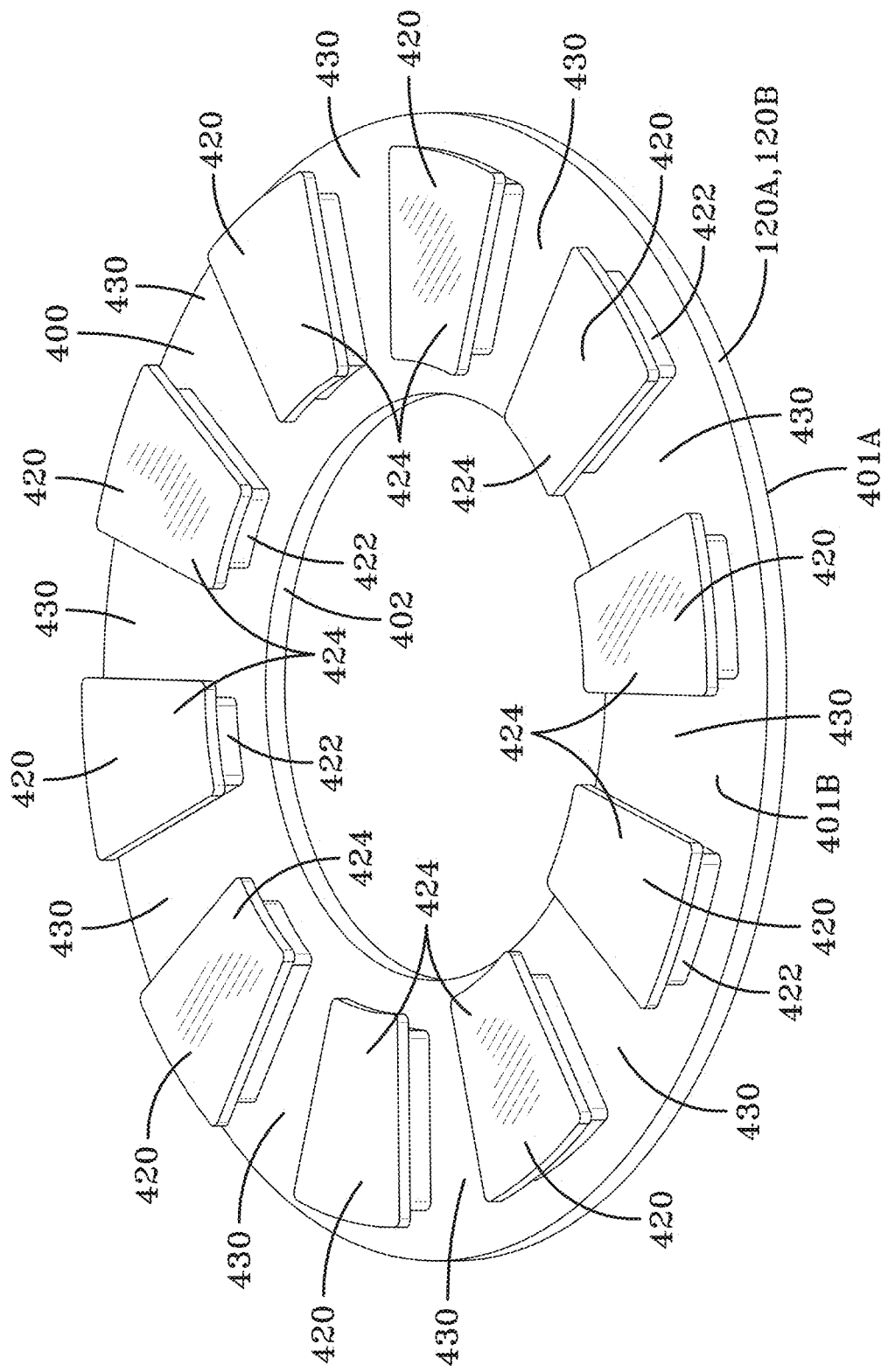
FIG. 6 is a perspective view of the stators used by the AFM in accordance with the concepts of the various embodiments disclosed herein.

The stators 120A and 120B, as shown in FIGS. 6 and 11A, are structurally equivalent, and as such, only the stator 120A is discussed below. In particular, the stator 120A includes a core or body 400. The core 400 may be formed of laminated ferromagnetic material including tape-wound ferromagnetic material (FIG. 7), which includes but is not limited to: silicon, nickel, iron, steel or any other suitable ferromagnetic material, as well as composites thereof, such as soft magnetic composites (SMC). It should be appreciated that in other embodiments, non-laminated ferromagnetic material may be used for the core 400. The stator core or body 400 is formed as a ring and includes opposed annular surfaces 401A and 401B that include an aperture 402 therethrough. In addition, a plurality of teeth 420 extend from an inner surface 401B of the body 400 in an annular arrangement. Each of the teeth 420 includes a base 422 attached to the inner surface 401B, which is terminated by a cap or tip 424, as shown in FIGS. 11 and 11C In some embodiments, the tip 424 may be substantially trapezoidal in shape. Moreover, in other embodiments, the tip 424 may have a shape that matches the shape of the magnets 300. Furthermore, the tip 424 is larger than the dimension of the base 422 so that it overhangs beyond the peripheral edge of the base 422. The teeth 420 are spaced apart from each other by gaps 430. In addition, the gaps 430 permit electrically conductive wire windings or coils (not shown) to be wound around each one of the bases 422 of the teeth 420 to supply the necessary electric signal(s) to control the operation of the rotor 110 via a suitable control system. It should be appreciated that the stators 120A-B may have any number of teeth 420, such as 12 for example.

Thus, when the axial flux machine 100 is assembled, the rotor 110 is disposed between the stators 120A and 120B. In particular the teeth 420 of stator 120A are positioned proximate or adjacent to the outer surface 162A of the outer ring 160A of the rotor 110, and the teeth 420 of the stator 120B are positioned proximate or adjacent to the outer surface 162B of the outer ring 160B of the rotor 110. Furthermore, the centers of the main aperture 180 of the rotor 110 and the aperture 402 of the stators 120A-B are axially aligned. It should be appreciated that in some embodiments the teeth 420 of the stator 120A and the stator teeth of stator 120B are rotationally or angularly offset from each other. That is, the teeth 420 of the stators 120A and B may be configured so that the teeth 420 of the stators 120A and 120B are not directly aligned with each other, but are configured so that the teeth 420 of stator 120A are offset by an angle from the teeth 420 of the stator 120B, as shown in FIGS. 9, 10, and 10A. In other words one of the stators 120A or 120B is rotated about a center axis that extends through the center of the aperture 402 by an offset angle so that the teeth 420 of the stators 120A and 120B are offset from each other, so that their tips 424 overhang one another. For example, such offset angle between the stators 120A and 120B may be in a range between 0 to $$\left(\frac{360}{\text{number of rotor poles} \times 2}\right)$$

mechanical degrees. However, in some embodiments, the offset angle between the stators 120A and 120B may be about 18 degrees, for example, as shown in FIG. 9.

With the stators 120A-B fixed in position, rotor 110 is controlled to rotate therebetween by applying the necessary electrical control signals to one or more of the windings provided about the by the teeth 420 of the stators 120A-B.

It should be appreciated that while the AFM 100 discussed above incudes 12 magnet pairs to form 10 rotor poles in each of the stator gaps 250A and 250B, and that the teeth 420 of the stators 120A-B each form 12 stator poles, the AFM 100 may be configured with any suitable number of rotor poles and stator poles.

In summary, the rotor 110 carries multiple layers 250A-B of annularly or circumferentially arranged magnets. In addition, the magnets are arranged in pairs in each layer or gap 250A-B, and each magnet is arranged at an angle, such as $\alpha_m$ shown in FIG. 11B, relative to the other magnets to which it is adjacent in a given layer or gap 250A-B. For example, the magnets 300 may be arranged at alternating angles to one another in a given layer or gap 250. Furthermore, each pair of magnets forms a pole. It should be appreciated that while 2 layers or gaps 250A and 250B are discussed herein, such should not be construed as limiting, as any number of layers or gaps 250 carrying magnets 300 may be utilized by the rotor 100 of the AFM 100. Furthermore, the number of stator teeth and rotor poles discussed herein should not be construed as limiting, as any suitable number of each may be utilized by the AFM 100.

EXPERIMENTAL SECTION

The following discussion is directed to the development and testing of an embodiment of the axial flux machine 100 disclosed herein, with it being understood that other embodiments and variations of the axial flux machine 100 are not limited thereby and are contemplated as well.

I. Design Procedure

A. Motor Specifications

The specifications for the design of axial flux machine or motor 100 are given in Table 1 shown in FIG. 12. In particular, a 5.75 kW motor was sought with a rated speed of approximately 2000 RPM. The maximum axial length and the outer diameter of the motor 100 are limited along with the electrical limitations of 19 A RMS and a nominal voltage of 400 V in the DC bus. In some configurations, the motor 100 may be cooled with a cooling jacket. The current density may be 9 A/mm². To achieve the desired performance, rare earth NdFeB magnets with a remnant flux density of 1.21 T and M270_35A silicon steel lamination-based toroidal tape-wound cores were used for the rotor 110 and stator cores 120A-B.

B. Design Procedure

The general sizing equation for axial flux machine 100 is given by:

$$P_r = \frac{m}{m_1}\frac{\pi}{2}k_e k_i k_p \eta B_g A \frac{f}{p}(1-\gamma^2)D_o^3 \qquad (1)$$

Where m is the number of phases, $k_e$ is the back-EMF waveform factor, $k_i$ is the current wave form factor, $k_p$ is the power waveform factor, $\eta$ is the efficiency, $B_g$ is the airgap flux density, f is the operating frequency, P is the number of poles, $D_o$ is the outer diameter and $\gamma$ is the ratio of the inner diameter to the outer diameter.

In AFMs, high outer diameter is preferred as the power is proportional to the $D_0^3$. The selection of the optimum value of $\gamma$=0.63 resulted attaining the highest torque density.

In the AFM 100, double layer fractional slot concentrated windings may be used for ease of manufacturing and reduction of end winding length, although others may be used. Increasing the number of poles allows a decrease in the yoke thickness. Thus, if electric and magnetic loading were kept constant, higher number of poles would allow for a smaller machine. For a given size, a higher number of poles are desired to reduce the electrical loading. The 12 stator pole and 10 rotor pole (12/10) option allows higher winding factor, but it exhibits a higher eddy current loss. The winding factor for the 12/10 is 0.966. The magnet thickness ($L_m$) can be calculated from $$L_m = PCF_{lkg}g \qquad (2)$$

Where, $F_{lkg}$ is the flux leakage factor, PC is the permeance coefficient, and g is the active airgap.

The initial dimensions of the machine 100 were sized using equations (1) and (2). They were then further optimized in each machine through 3D FEA (finite element analysis) design sweeps using a design of experiment based optimization method. The number of turns and slot height was adjusted to meet the torque requirements and reduce copper losses. The back-iron thickness was adjusted in 3D (three dimensional) FEA to avoid excessive saturation.

C. Effect of Magnet Angle and Flux Barrier Width

Figure 13:
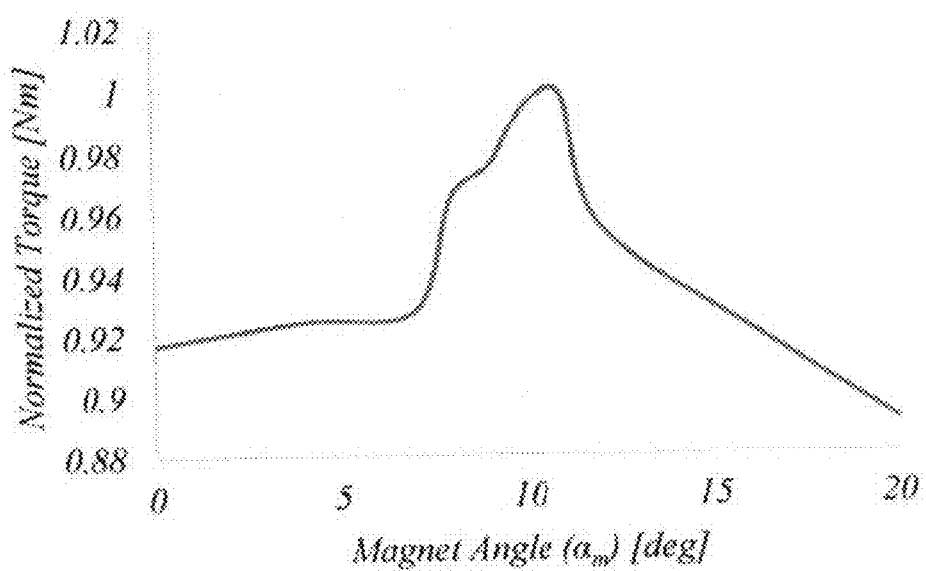
FIG. 13 is a graph showing the effects of bridge arc angle on average torque.
Figure 14:
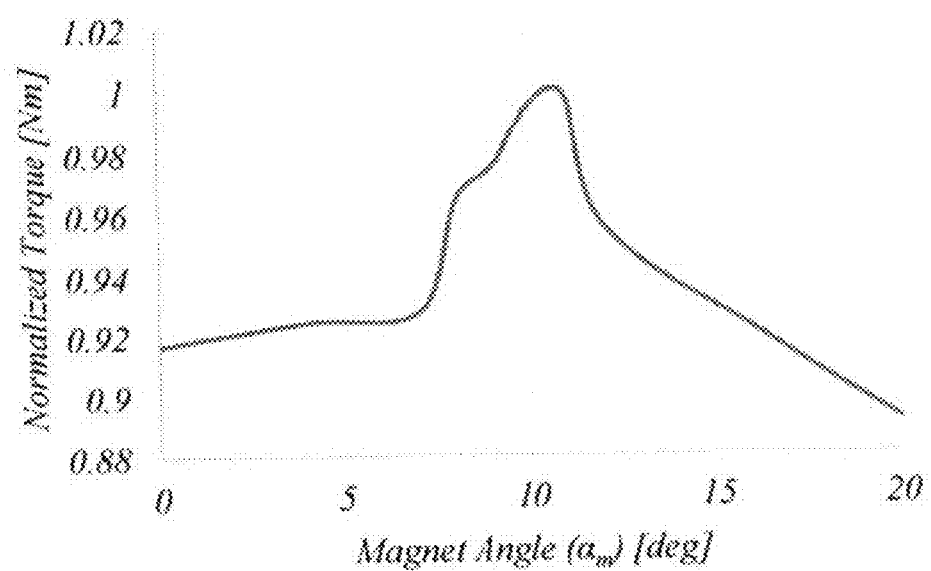
FIG. 14 is a graph showing motor geometric parameters.

In the machine 100, the "V" or angle between a pair of magnets 300 of groups C and D affects the performance of the machine 100. Higher angles $\alpha_m$ between the magnets 300, as shown in FIG. 11B, result in higher airgap flux densities and increase output torque. However, excessive increases in the bridge are results in reversing the effects of flux concentration. This is due to a reduction in the magnet height with increasing magnet angles to stay with the rotor dimensional constraints. The effect is illustrated in FIG. 13.

Figure 15:
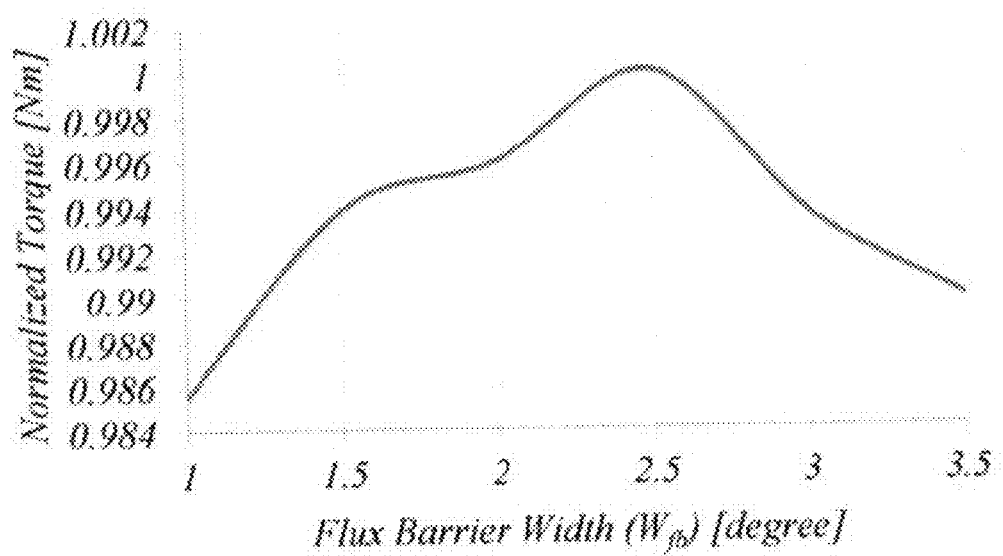
FIG. 15 is a graph showing the effect of flux barrier arc on average torque.

The flux barrier width is the angular width of the flux barrier that is located on the closest tip of the magnet as shown in FIGS. 11A-C. The effect of the $W_{fb}$ variation is shown in FIG. 15. As the flux barrier increases the reluctance torque in the machine increases. This results in an increase of the overall torque of the machine 100. However, beyond an optimum point, the core around the flux barrier saturates resulting in a gradual decline of average torque at the rated conditions.

Figure 16:
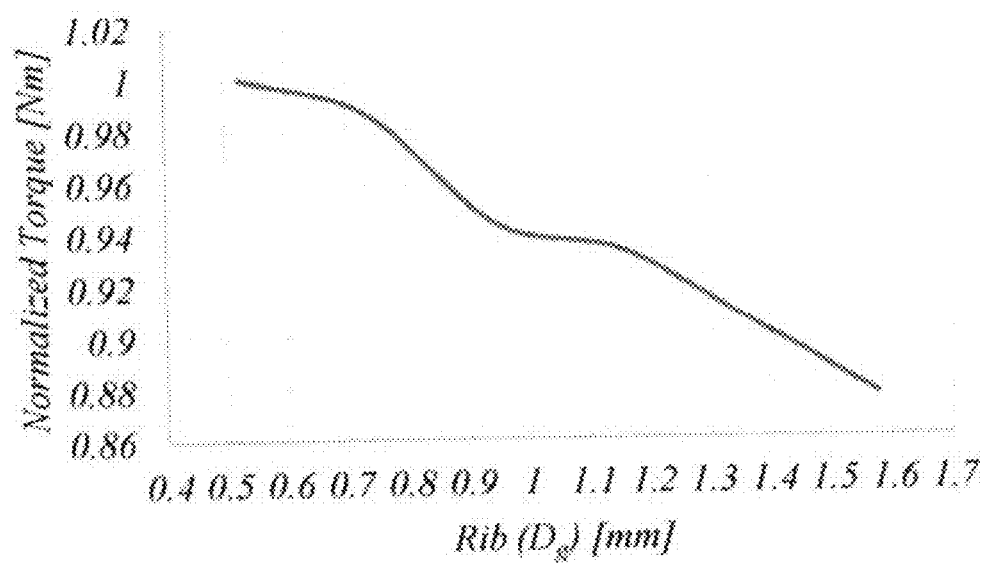
FIG. 16 is a graph showing the effect of Rib on average torque.

The effect of the flux barrier distance to the airgap, $D_g$, (FIG. 11B) also called Rib, was investigated. It is a challenge to minimize this dimension in radial flux machines due to it is being the weakest region of the rotor radios through the stator. Such extension not only changes the motor characteristics, but also makes the motor open to the catastrophic failures. In the AFM 100, the Rib does not have as high mechanical stress as the Rib in radial flux IPMs. Therefore, there is more freedom for reducing the Rib dimension. As it can be seen from the FIG. 16, having no Rib is the best option, but a practical solution is to have a Rib just to hold a portion of the rotor steel for tooling.

D. Torque Ripple Minimization

Torque ripple is an important concern in IPM machines and it is related to the interaction between the stator teeth, slots, and the rotor position. Based on the rotor position, flux lines pass through the airgap and go into the stator through teeth, however, the existence of the stator slot openings cause flux to decrease significantly for some instances. To keep the torque ripple low, the flux line distribution should be same during the operation. Adding extra flux barriers, and shaping the existing flux barrier openings, are known methods that are effectively reducing the torque ripple. However, its applicability is limited especially in AFMs due to the geometric complexity. One solution is to extend the stator tooth tips. This avoids the excessive reduction of the flux; however, it affects manufacturability of the motor. Extending tooth tips makes slot openings impractically small to insert the phase windings.

E. Cogging Torque Minimization

Multiple aspects influence the cogging torque amplitude, such as number of stator slots, number of rotor poles, magnet arcs, etc. Other than optimizing these quantities, some additional geometrical modifications can even decrease the cogging torque further. Skewing the magnets 300, extending the stator 120 tooth tips, alternating the magnet arcs are reported to be effective solutions. Magnet skewing and alternating magnet arcs are not suitable techniques for use by machine 100. However, stator tooth tips can be adjusted for minimizing cogging torque. Using stator tooth tip extension, 0.7 Nm peak to peak cogging torque is achieved.

II. Electromagnetic Analysis

Figure 17:
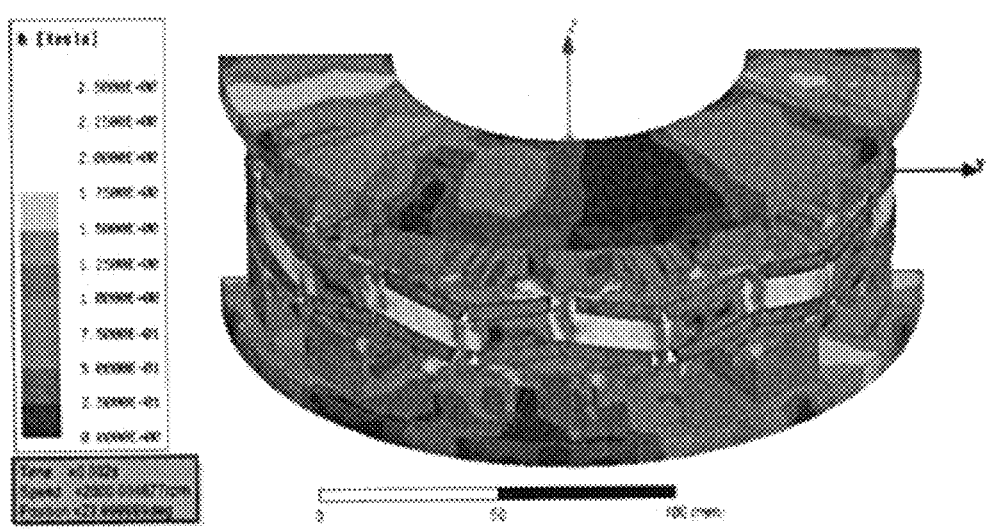
FIG. 17 is a chart showing the flux density distribution of an AFM IPM.
Figure 18:
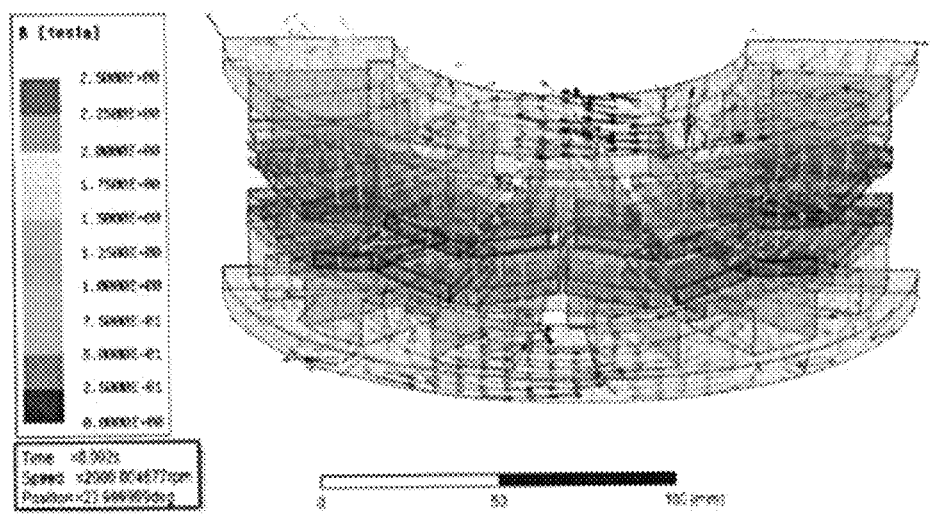
FIG. 18 is a chart showing flux vectors of the AFM machine disclosed herein in accordance with the concepts of the various embodiments disclosed herein.
Figure 19:
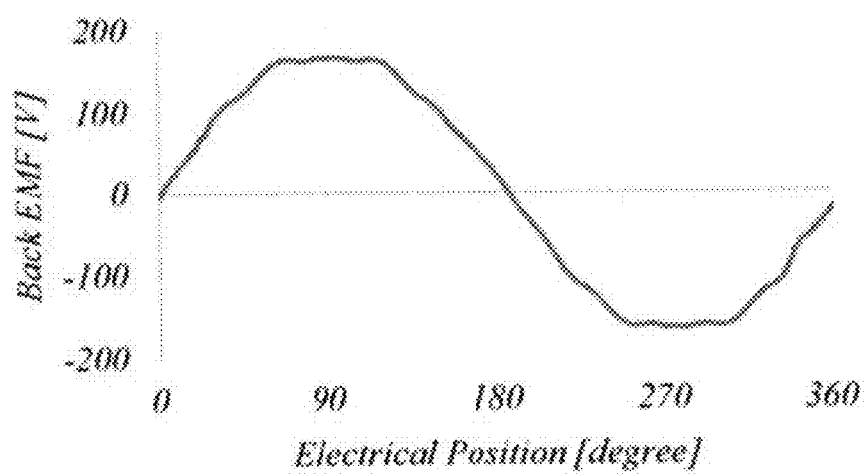
FIG. 19 is a graph showing back EMF of the AFM machine disclosed herein in accordance with the concepts of the various embodiments disclosed herein.

In order to verify the performance of the motor 100, 3D FEA was used for performance verification and further optimization after the initial sizing. The flux density of the machine 100 at no load is shown in FIG. 17 and the flux vectors are shown in FIG. 18. Sinusoidal currents are used for the excitation. Back-EMF voltage waveform at rated speed is presented in FIG. 19. Harmonic analysis indicated that the back EMF waveform has high $3^{rd}$, $5^{th}$ and $7^{th}$ order harmonics with a total harmonic distortion (THD) of 5.73%. There is a trade-off between the distributed and concentrated windings. The concentrated winding has a lower winding resistance and higher back-EMF harmonics, while the distributed winding has a higher winding resistance and leakage inductance and lower back-EMF harmonics.

Figure 20:
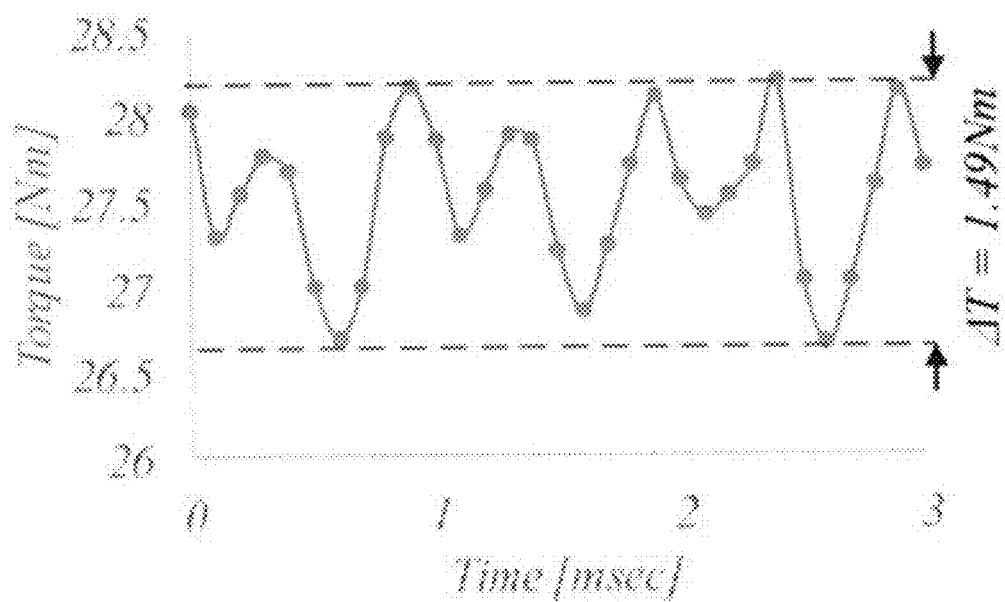
FIG. 20 is a graph showing torque ripple of the AFM machine disclosed herein in accordance with the concepts of the various embodiments disclosed herein.

The $5^{th}$ and $7^{th}$ harmonics on the back-EMF voltage gives rise to a torque ripple. The torque ripple of the motor 100 is 1.49 Nm, which is 5.4% of the rated torque as shown in FIG. 20.

Another important design requirement is the cogging torque. Peak-to-peak variation of the cogging torque needs to be kept under 1 Nm. The 12/10 pole configuration and the stator tooth tips optimization of the motor 100 allows the peak-to-peak value of the cogging torque to be reduced to 0.5 Nm.

III. Comparison

Figure 21A:
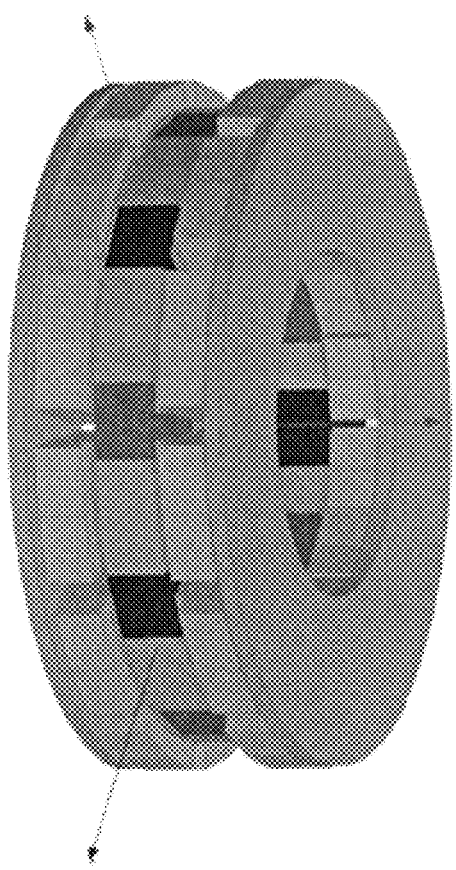
FIG. 21A is a perspective view showing an AF-IPM topology.
Figure 21B:
FIG. 21B is a perspective view showing an AF-SPM topology.

The motor or machine 100 was compared with the conventional double stator single rotor AF-SPM with NN magnet orientation and a double stator single rotor IPM given in FIG. 21A and FIG. 21B, respectively. Design and optimization of these motors was made using the procedure outlined above. The outer and inner diameters and the stack length were kept the same for comparison purposes. The results and some of the performance parameters are given in Tables 2 and 3, shown in FIGS. 22A and 22B, respectively. As it is mentioned earlier, placing interior PMs increases the rotor thickness. Therefore, the weight of the IPM motors is higher than the AF-SPM. Consequently, the torque densities of the IPMSMs are lower. However, the efficiency and CPSR capability is higher for the AF V-IPM. The saliency ratio of the AF V-IPM or motor 100 is higher than the other AFMs. Compared to radial machines the saliencies of the AFM V-IPM 100 is still low. This is due to the design application that has stringent cogging torque requirements. To reduce the cogging torque, the saliency ratio is sacrificed as a trade-off. The iron loss and copper loss of the IPM motors are also lower than the AF SPM. Among these motors, the AF V-IPM 100 needs the lowest number of magnets due to its higher saliency ratio. However, the torque density of the AF V-IPM 100 is lower, as a thicker rotor back-iron is used to reduce saturation and improve efficiency.

IV. Wide-Speed Operation of AFM

Figure 23:
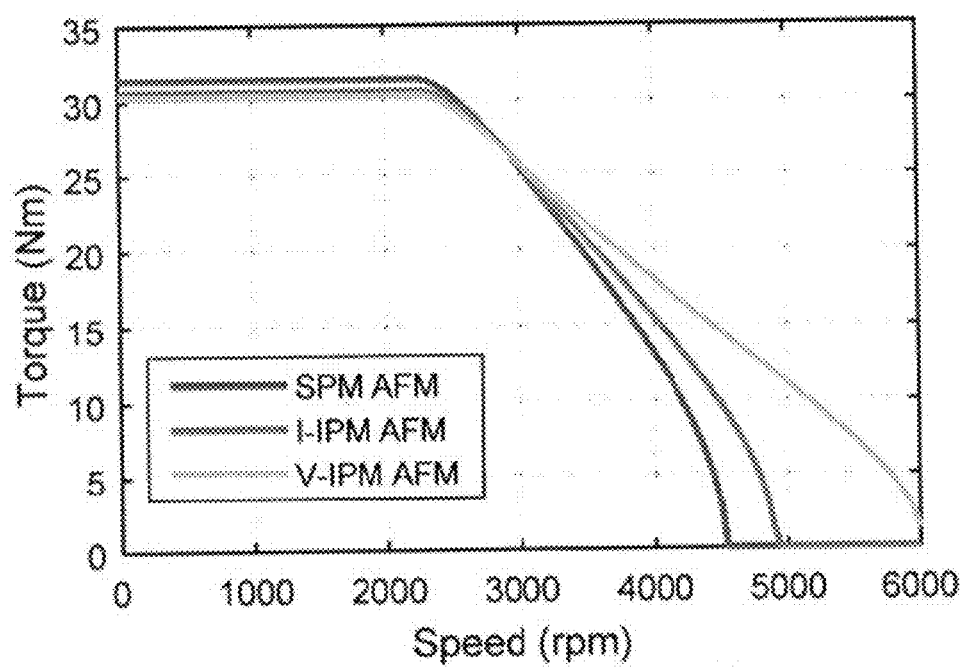
FIG. 23 is a graph showing torque speed characteristics in accordance with the concepts of the various embodiments disclosed herein.

The machine or AF V-IPM 100 is compared with two of its counterparts in terms of torque speed range, as shown FIG. 23. AF V-IPM 100 provides comparable amount of torque as the other two machines under consideration, but it exhibits comparatively higher torque output above the base speed. The improved torque speed performance at higher speed is credited to higher saliency ratio in AF V-IPM 100. Due to the higher saliency ratio, the machine 100 produces reluctance torque while weakening the flux. The reluctance torque also facilities the use of less magnets.

Figure 24:
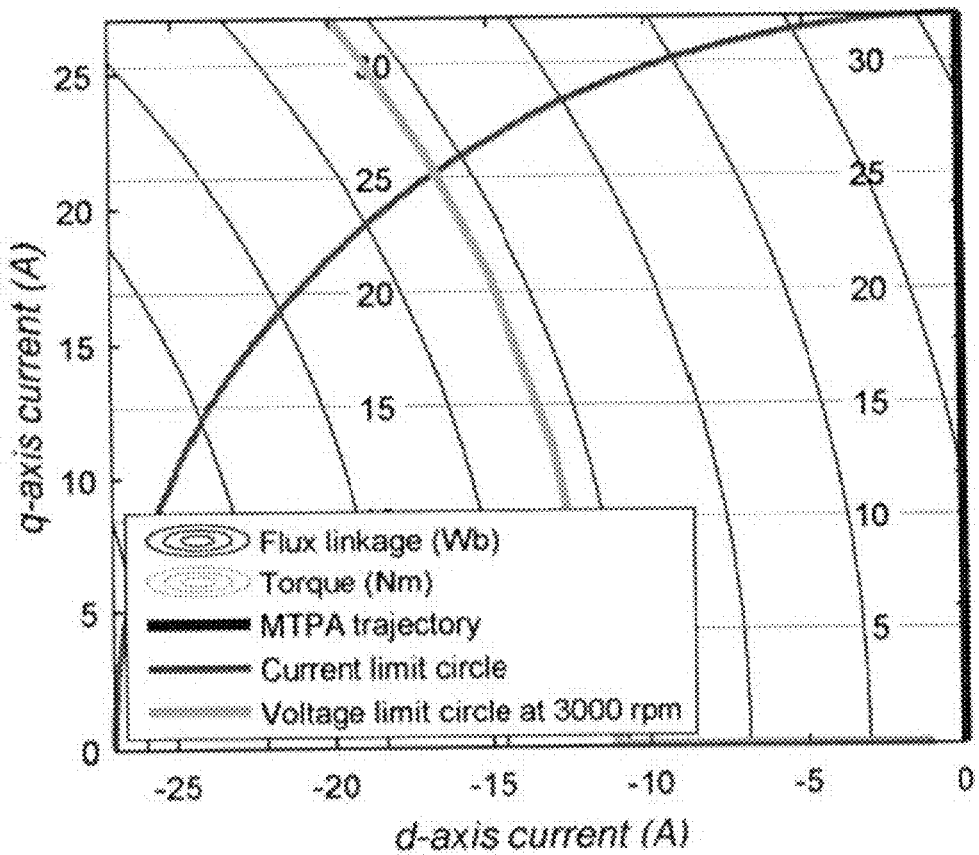
FIG. 24 is a graph showing a characteristic plot of the AF-SPM.
Figure 25:
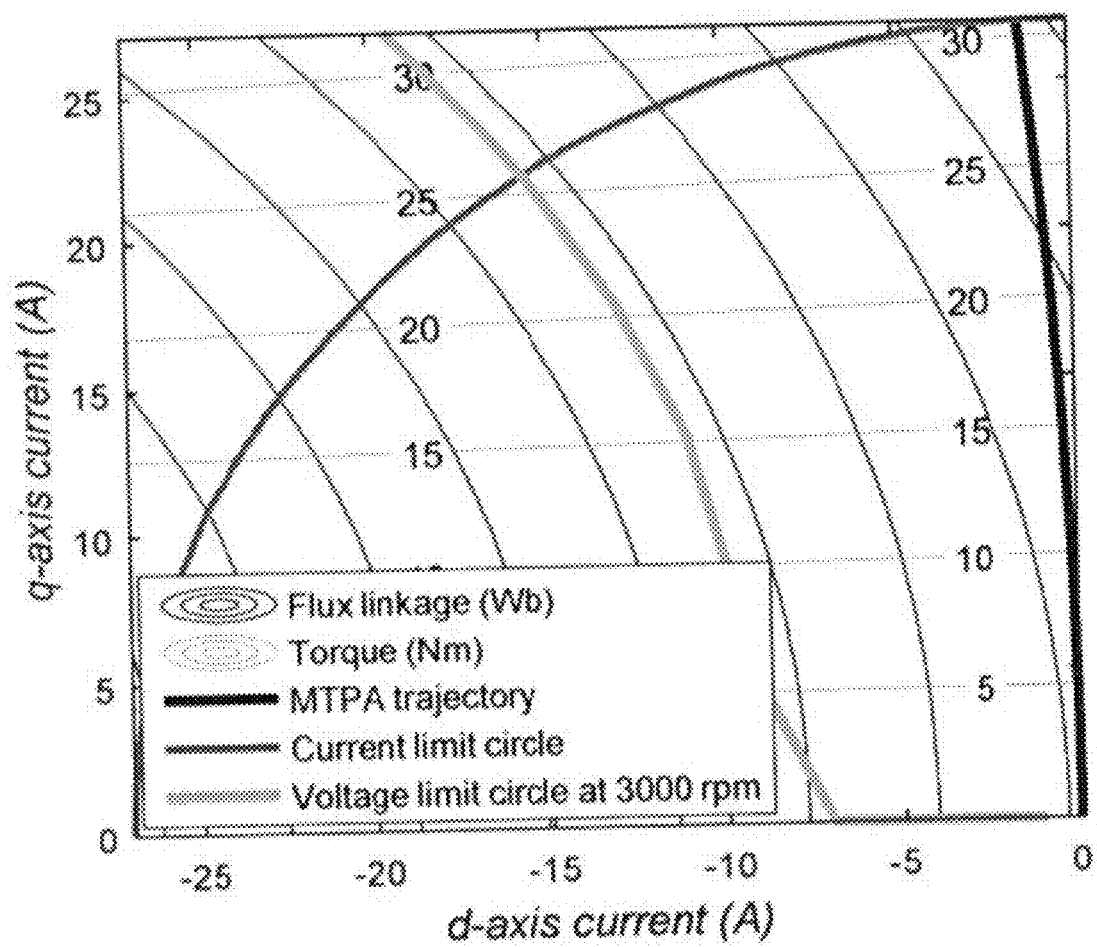
FIG. 25 is a graph showing a characteristic plot of the AF-IPM.
Figure 26:
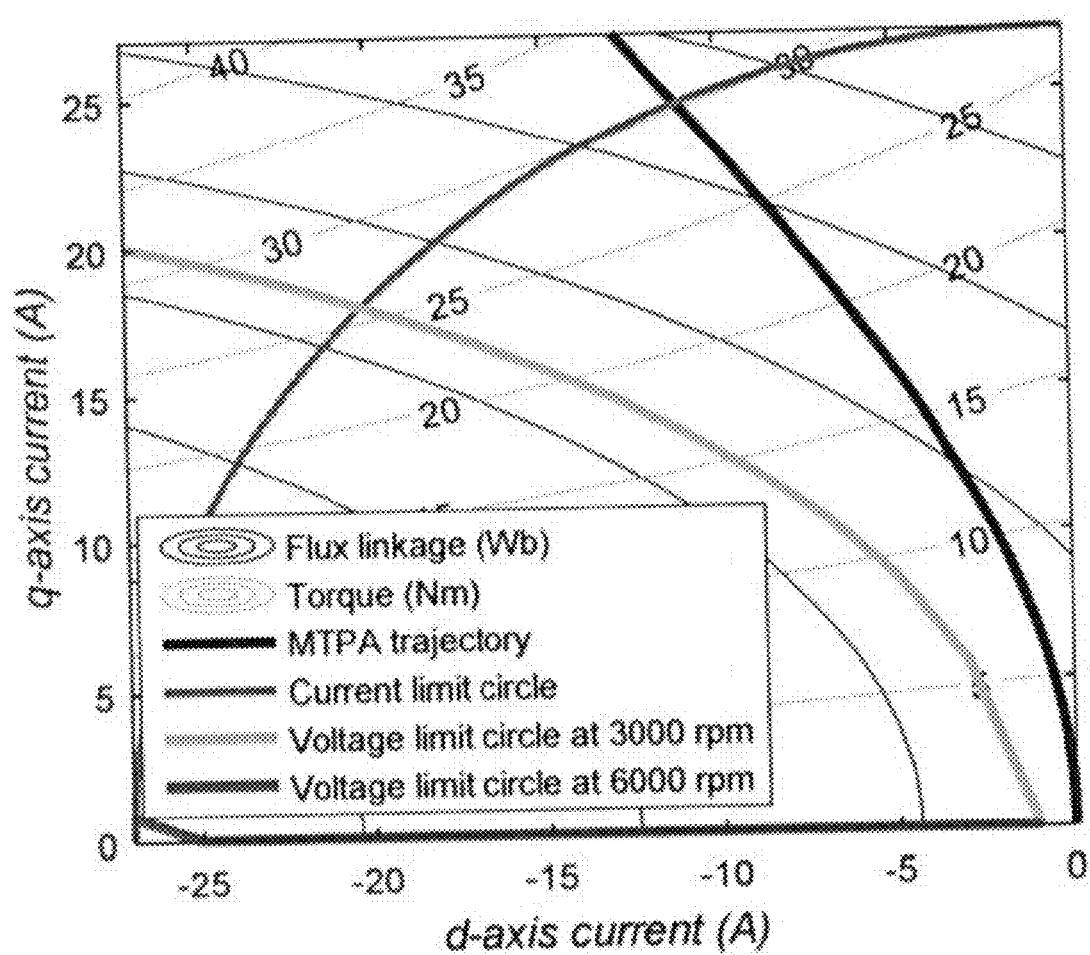
FIG. 26 is a graph showing a characteristic plot of the AF V-IPM disclosed herein and in accordance with the concepts of the various embodiments disclosed herein.

The characteristic plots of the three machines are shown in FIGS. 24-26. In the AF-SPM, there is very little saliency and reluctance torque. As a result, the MTPA trajectory is along the origin of the d-axis current. The torque in the characteristic planes also takes a more parabolic shape.

V. Manufacturing of AF V-IPM

Figure 3:
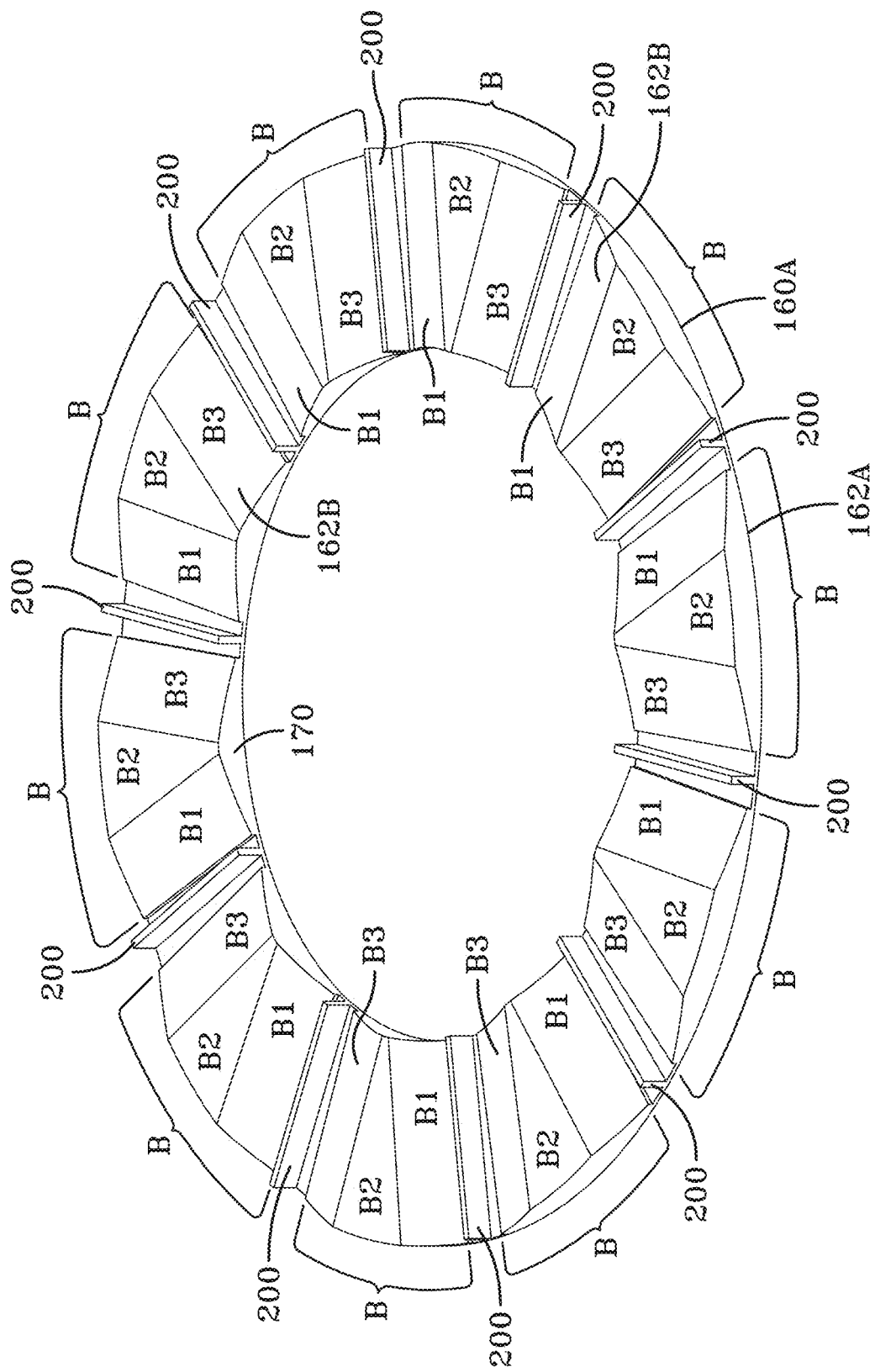
FIG. 3 is perspective view of an outer ring of the rotor in accordance with the concepts of the various embodiments disclosed herein.

The main issue with IPM versions of AFMs is the manufacturability of such machines. The components (rotor 110 and stators 120A-B) AFM 100 are designed to be manufactured from tape-wound cores as shown in FIG. 7. The stators 120A-B were manufactured in two stages. In the first stage, the stators 120 having only the teeth 420 would be machined out from the tape-wound core 400, as shown in FIG. 6. The stator is then wound, and the tips 424 are glued on to the stator teeth 420. The rotor 110 construction includes slots or gaps 250A-B in the rotor 110 for the magnets 300 to be inserted as show in FIG. 2. The expected rotor construction method would involve cutting the rotor 100 in three different segments 150, 160A, 160B and then attaching them together, such as by adhesive, as shown in FIGS. 3 and 4. The magnets 300 would be inserted at the end of the process.

VI. Conclusion

In this paper, an interior permanent magnet axial flux synchronous motor (AF V-IPM) 100 is proposed with the "V"-oriented or angled magnet placements. The motor structure has a high-saliency ratio, utilizes a reduced number of magnets, has less cogging torque, and has a wider speed range as compared to the conventional surface-mounted AFMs. The motor 100 was compared with AF SPMs and AF IPMs, which were designed and optimized using the same procedure using a dual stator single rotor machine structure. The results demonstrated that the motor 100 meets the design requirements with reduced magnet usage and higher efficiency with a wider speed range of operation.

Therefore, it can be seen that the objects of the various embodiments disclosed herein have been satisfied by the structure and its method for use presented above. While in accordance with the Patent Statutes, only the best mode and preferred embodiments have been presented and described in detail, with it being understood that the embodiments disclosed herein are not limited thereto or thereby. Accordingly, for an appreciation of the true scope and breadth of the embodiments, reference should be made to the following claims.

What is claimed is:

1. An axial flux machine comprising:
a first stator having a plurality of spaced teeth and a first aperture;
a second stator having a plurality of spaced teeth and a second aperture; and
a rotor having a third aperture, said rotor being rotatable between said first and second stators, said rotor including a central ring spaced apart from a first outer ring to define a first annular gap and spaced apart from a second outer ring to define a second annular gap;
wherein centers of said apertures are axially aligned with an axis,
wherein said first stator is rotated about said axis by an offset angle relative to said second stator, such that said teeth of said first stator and said teeth of said second stator are offset from each other by said offset angle;
said first annular gap including a first plurality of magnets, wherein each said magnet in said first annular gap is positioned at an angle relative to said magnets adjacent thereto that are in said first annular gap,
said second annular gap including a second plurality of magnets, wherein each said magnet in said second annular gap is positioned at an angle relative to said magnets adjacent thereto that are in said second annular gap,
wherein each pair of said magnets in said first channel annular gap is separated from adjacent pairs of said magnets by a flux barrier width, wherein each pair of said magnets in said second channel annular gap is separated from adjacent pairs of said magnets by a second flux barrier width.

2. The axial flux machine of claim 1, wherein each said magnet in said first annular gap overlaps one of said magnets in said second annular gap, and wherein said overlapping magnets are parallel with each other.

3. The axial flux machine of claim 1, wherein each said magnet in said first annular gap overlaps one of said magnets in said second annular gap, and wherein said overlapping magnets are non-parallel with each other.

4. The axial flux machine of claim 1, wherein each consecutive pair of said magnets are magnetized in different axial directions.

5. The axial flux machine of claim 1, wherein each pair of said magnets in said first annular gap is disposed between a pair of projections, and
wherein each pair of said magnets in said second annular gap is disposed between a pair of projections.

6. The axial flux machine of claim 5, wherein one of said magnets of each said pair of magnets in said first annular gap is magnetized in a first axial direction and overlaps one of said magnets of each said pair of magnets disposed in said second annular gap that is magnetized in another axial direction that is different from said first axial direction.

7. The axial flux machine of claim 1, wherein said magnets comprise NdFeB.

8. The axial flux machine of claim 1, wherein said teeth of said first stator and said teeth of said second stator are offset from each other by said offset angle of about 18 degrees.

9. The axial flux machine of claim 1, wherein one or more of said rotor, said first stator and said second stator comprise laminated ferromagnetic material.

10. The axial flux machine of claim 1, wherein each pair of said magnets includes a first magnet separated from a second magnet by a magnet angle.

11. An axial flux machine comprising:
a first stator having a plurality of spaced teeth and a first aperture;
a second stator having a plurality of spaced teeth and a second aperture; and
a rotor having a third aperture, said rotor being rotatable between said first and second stators,
wherein centers of said apertures are axially aligned with an axis,
wherein said first stator is rotated about said axis by an offset angle relative to said second stator, such that said teeth of said first stator and said teeth of said second stator are offset from each other by said offset angle;
wherein said rotor includes a first group of circumferentially disposed magnets, wherein each said magnet of said first group is positioned at an angle relative to said magnets adjacent thereto that are in said first group,
wherein said rotor includes a second group of circumferentially disposed magnets, wherein each said magnet of said second group is positioned at an angle relative to said magnets adjacent thereto that are in said second group, and
wherein each pair of said magnets in said first group is separated from adjacent pairs of said magnets by a flux barrier width, and wherein each pair of said magnets in said second group is separated from adjacent pairs of said magnets by a second flux barrier width.

12. The axial flux machine of claim 11, wherein each said magnet in said first group overlaps one of said magnets in said second group, and wherein said overlapping magnets are parallel with each other.

13. The axial flux machine of claim 11, wherein each said magnet in said first group overlaps one of said magnets in said second group, and wherein said overlapping magnets are non-parallel with each other.

14. The axial flux machine of claim 11, wherein adjacent pairs of said magnets are magnetized in different axial directions.

15. The axial flux machine of claim 11, wherein each pair of said magnets in said first group is disposed between a pair of projections, and
wherein each pair of said magnets in said second group is disposed between a pair of projections.

16. The axial flux machine of claim 15, wherein one of said magnets of each said pair of magnets disposed in said first group is magnetized in a first axial direction overlaps one of said magnets of each said pair of magnets disposed in said second group that is magnetized in another axial direction that is different from said first axial direction.

17. The axial flux machine of claim 11, wherein said magnets comprise NdFeB.

18. The axial flux machine of claim 11, wherein said teeth of said first stator and said teeth of said second stator are offset from each other by said offset angle of about 18 degrees.

19. The axial flux machine of claim 11, wherein one or more of said rotor, said first stator and said second stator comprise tape-wound laminated ferromagnetic material.

20. The axial flux machine of claim 11, wherein each pair of said magnets includes a first magnet separated from a second magnet by a magnet angle.

21. An axial flux machine comprising:
a first stator having a plurality of spaced teeth;
a second stator having a plurality of spaced teeth; and
a rotor being rotatable between said first stator and said second stator,
wherein said first stator is rotated about said axis by an offset angle relative to said second stator, such that said teeth of said first stator and said teeth of said second stator are offset from each other by said offset angle;

wherein said rotor includes a first group of circumferentially disposed magnets, with said magnets of said first group being positioned at alternating angles to one another, wherein said rotor includes a second group of circumferentially disposed magnets, with said magnets of said second group being positioned at alternating angles to one another, and wherein each pair of said magnets in said first group is separated from adjacent pairs of said magnets by a flux barrier width, and wherein each pair of said magnets in said second group is separated from adjacent pairs of said magnets by a second flux barrier width.

22. The axial flux machine of claim 21, wherein each one of said magnets is positioned in a cavity that is larger in dimension than said magnets.

23. The axial flux machine of claim 22, wherein said cavity includes air.

* * * * *